(12) United States Patent
Hassan et al.

(10) Patent No.: US 9,629,004 B2
(45) Date of Patent: *Apr. 18, 2017

(54) INDICATION OF WIRELESS SIGNAL QUALITY USING DETECTED ERRORS IN DATA

(71) Applicant: Microsoft Technology Licensing, LLC, Redmond, WA (US)

(72) Inventors: Amer A. Hassan, Kirkland, WA (US); Andrei Jefremov, Jarfalla (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 36 days.

This patent is subject to a terminal disclaimer.

(21) Appl. No.: 14/517,330

(22) Filed: Oct. 17, 2014

(65) Prior Publication Data

US 2016/0112884 A1   Apr. 21, 2016

(51) Int. Cl.
*H04W 4/00*   (2009.01)
*H04W 24/02*   (2009.01)
*G06F 3/048*   (2013.01)
*H04L 1/08*   (2006.01)
*H04L 12/24*   (2006.01)
(Continued)

(52) U.S. Cl.
CPC ............ *H04W 24/02* (2013.01); *G06F 3/048* (2013.01); *H04B 17/318* (2015.01); *H04L 1/004* (2013.01); *H04L 1/0026* (2013.01); *H04L 1/08* (2013.01); *H04L 41/22* (2013.01); *H04L 1/0009* (2013.01); *H04L 1/0014* (2013.01)

(58) Field of Classification Search
CPC . H04L 1/004; H04L 1/08; H04L 41/22; H04L 1/0026; H04L 1/009; H04L 1/0014; H04W 24/02
See application file for complete search history.

(56) References Cited

U.S. PATENT DOCUMENTS 6,141,388 A   10/2000   Servais et al.
6,442,143 B1   8/2002   Corry
(Continued)

FOREIGN PATENT DOCUMENTS

EP   2755369   7/2014
WO   WO-9919995   4/1999
(Continued)

OTHER PUBLICATIONS

"International Search Report and Written Opinion", Application No. PCT/US2015/055410, Jan. 22, 2016, 15 pages.
(Continued)

*Primary Examiner* — Abdelnabi O Musa

(57) ABSTRACT

Techniques for indication of wireless signal quality are described. According to various implementations, attributes of a wireless signal are detected and processed to ascertain a quality of the wireless signal. Based on an ascertained signal quality, indicia of the signal quality can be exposed. For instance, an indication of wireless signal quality is communicated to an application and/or service that manages communication of media data. According to one or more embodiments, an application/service may perform one or more actions based on the indication of signal quality, such as a procedure to improve signal quality, a procedure to optimize wireless performance, and so forth.

20 Claims, 14 Drawing Sheets

(51) Int. Cl.
*H04B 17/318* (2015.01)
*H04L 1/00* (2006.01)

(56) References Cited

U.S. PATENT DOCUMENTS

| | | | |
|---|---|---|---|
| 6,856,789 | B2 | 2/2005 | Pattabiraman et al. |
| 6,990,313 | B1 | 1/2006 | Yarkosky |
| 7,035,661 | B1 | 4/2006 | Yun |
| 7,761,119 | B2 | 7/2010 | Patel |
| 7,864,678 | B1 | 1/2011 | Sampath et al. |
| 8,295,189 | B2 | 10/2012 | Hassan et al. |
| 8,634,495 | B2 | 1/2014 | Harel et al. |
| 8,724,484 | B2 | 5/2014 | Jones et al. |
| 8,744,391 | B2 * | 6/2014 | Tenbrook ............ H04W 48/16 455/226.2 |
| 2002/0136268 | A1 | 9/2002 | Gan et al. |
| 2008/0025341 | A1 * | 1/2008 | Rao ................... H04W 72/048 370/468 |
| 2008/0225811 | A1 * | 9/2008 | Wentink ............... H04L 1/1671 370/338 |
| 2008/0279092 | A1 * | 11/2008 | Hassan ................. H04L 1/203 370/216 |
| 2009/0111526 | A1 * | 4/2009 | Masri ............... H04M 1/72519 455/566 |
| 2009/0207748 | A1 * | 8/2009 | Choi .................. H04L 43/0811 370/252 |
| 2010/0054512 | A1 | 3/2010 | Solum |
| 2010/0124204 | A1 * | 5/2010 | Won .................... H04W 36/30 370/332 |
| 2012/0141002 | A1 | 6/2012 | Urbano et al. |
| 2013/0163536 | A1 | 6/2013 | Anderson et al. |
| 2013/0295895 | A1 | 11/2013 | Locker et al. |
| 2014/0143629 | A1 | 5/2014 | Hassan |
| 2014/0187238 | A1 | 7/2014 | Tsuda |
| 2015/0038156 | A1 * | 2/2015 | Kilpatrick, II ........ H04W 64/00 455/452.1 |
| 2016/0112883 | A1 | 4/2016 | Hassan et al. |

FOREIGN PATENT DOCUMENTS

| | | |
|---|---|---|
| WO | WO-2009018585 | 2/2009 |
| WO | WO-2014197122 | 12/2014 |

OTHER PUBLICATIONS

"Non-Final Office Action", U.S. Appl. No. 14/517,273, Nov. 19, 2015, 10 pages.
Chuang, "Uplink Power Control for TDMA Portable Radio Channels", IEEE Transactions on Vehicular Technology, Feb. 1, 1994, 8 pages.
Kodikara, "Link Adaptation for Real-time Video Communications in E-GPRS Networks", IEEE Proceedings: Communications, Institution of Electrical Engineers, Jun. 16, 2004, 5 pages.
Silva, "On Link Quality Aware Routing for Industrial Wireless Sensor Networks", International Conference on Industrial Technology, Feb. 25, 2013, 6 pages.
Tang, et al.,' "Channel Characterization and Link Quality Assessment of IEEE 802.15.4-Compliant Radio for Factory Environments", In Proceedings: IEEE Transactions on Industrial Informatics, vol. 3, No. 2, May 2007, 12 pages.
Zhou, et al.,' "A Novel Link Quality Assessment Method for Mobile Multi-Rate Multi-Hop Wireless Networks", In Proceedings: 6th IEEE Consumer Communications and Networking Conference, Jan. 10, 2009, 5 pages.
"Final Office Action", U.S. Appl. No. 14/517,273, Apr. 28, 2016, 12 pages.
"International Search Report and Written Opinion", Application No. PCT/US2015/054108, Jan. 22, 2016, 12 pages.
Hauer, "Mitigating the Effects of RF Interference through RSSI-Based Error Recovery", In Proceedings of 7th European Conference on Wireless Sensor Networks, Feb. 2010, 16 pages.
Mase, "RSSI-based Cross Layer Link Quality Management for Layer 3 Wireless Mesh Networks", In 17th International Conference on Software, Telecommunications & Computer Networks, Sep. 24, 2009, 5 pages.
Vlavianos, "Assessing Link Quality in IEEE 802.11 Wireless Networks: Which is the Right Metric?", In IEEE 19th International Symposium on Personal, Indoor and Mobile Radio Communications, Sep. 15, 2008, 6 pages.
"Non-Final Office Action", U.S. Appl. No. 14/517,273, Oct. 17, 2016, 10 pages.
"Second Written Opinion", Application No. PCT/US2015/054108, Sep. 15, 2016, 7 pages.
"Second Written Opinion", Application No. PCT/US2015/055410, Sep. 21, 2016, 10 pages.
"International Preliminary Report on Patentability", Application No. PCT/US2015/055410, Jan. 27, 2017, 10 pages.
"International Preliminary Report on Patentability", Application No. PCT/US2015/054108, Jan. 19, 2017, 9 pages.

* cited by examiner

INDICATION OF WIRELESS SIGNAL QUALITY USING DETECTED ERRORS IN DATA

BACKGROUND

Many devices today utilize some form of wireless data communication. While a variety of different types of wireless data communication exist, radio frequency (RF) communication is pervasive. Examples of RF communication include wireless cellular networks (e.g., for cell phones), broadband wireless (e.g., Wi-Fi®), broadcast television, global positioning system (GPS) navigation, and so forth.

Wireless data communication can be particularly useful in networking scenarios. For instance, a computing device can connect to a network, such as the Internet, via a wireless access point. Signal quality variations may occur, however, based on different network-related conditions that occur beyond a local access point. Enabling signal quality to be surfaced to users and other entities presents a number of challenges.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for indication of wireless signal quality are described. According to various implementations, attributes of a wireless signal are detected and processed to ascertain a quality of the wireless signal. Based on an ascertained signal quality, indicia of the signal quality can be exposed. For instance, an indication of wireless signal quality is communicated to an application and/or service that manages communication of media data. According to one or more embodiments, an application/service may perform one or more actions based on the indication of signal quality, such as a procedure to improve signal quality, a procedure to optimize wireless performance, and so forth.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
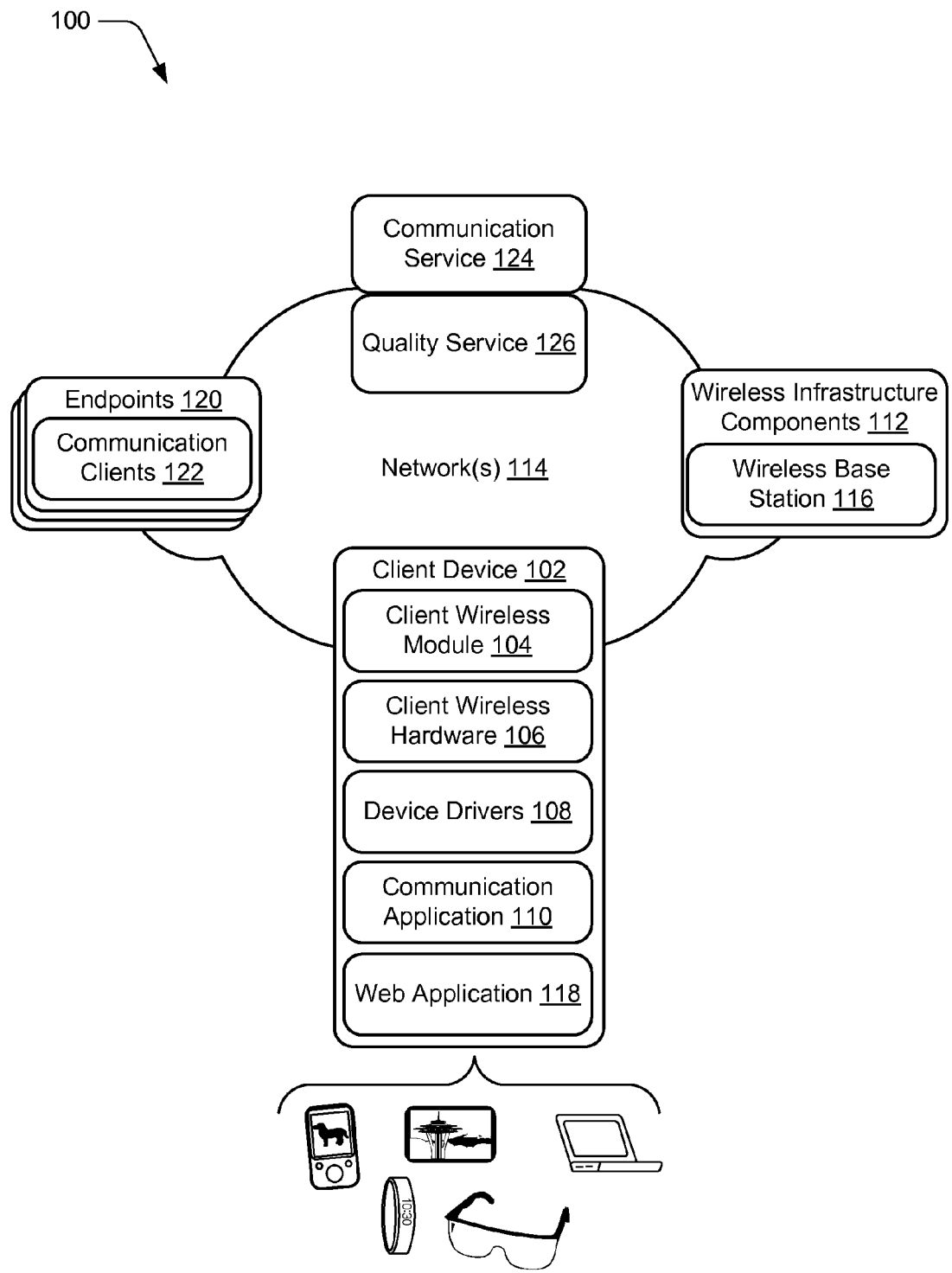
FIG. 1 is an illustration of an environment in an example implementation that is operable to employ techniques discussed herein in accordance with one or more embodiments.

Techniques for indication of wireless signal quality are described. According to various implementations, various attributes of a wireless signal are detected. The wireless signal, for instance, represents a wireless signal communicated between a wireless base station and a wireless device, such as a wireless client device. Example attributes of a wireless signal include signal strength (e.g., a Received Signal Strength Indicator (RSSI)), errors detected in data transmitted in the wireless signal, data transmission bandwidth over the wireless signal, and so forth.

According to various implementations, attributes of the wireless signal are processed to ascertain a quality of the wireless signal. Generally, signal quality provides an indicator of a level of fidelity with which a wireless signal transmits data, e.g., with reference to errors detected in wireless data. Based on an ascertained signal quality, indicia of the signal quality can be exposed. For instance, a graphical signal quality indicator can be displayed that provides a visual indicator of signal quality. In at least some implementations, a signal strength indicator is adjusted to reflect a signal quality of a representative signal.

According to one or more implementations, wireless signal can have high signal strength, e.g., a high received signal strength indicator (RSSI). The wireless signal, however, may include multiple data errors, such as flipped bits, omitted bits, inserted bits, and so on. Thus, a signal strength indicator for the wireless signal can be adjusted (e.g., reduced) based on the presence of the multiple data errors. For instance, an indication of signal strength can be adjusted downward to indicate that while the signal strength may be high, the number of data errors is also high.

According to various implementations, an indication of wireless signal quality is communicated to an application and/or service that manages communication of media data, such as a Voice over Internet Protocol (VoIP) application/service, a unified communications (UC) application/service, and so forth. The application/service then performs one or more actions based on the indication of signal quality. For instance, the application/service may perform a procedure to attempt to increase signal quality. As another example, the application/service may perform an optimization procedure based on the signal quality to optimize wireless performance. In at least some implementations, the application/service may cause a graphical representation of signal quality to be displayed, such as part of a graphical user interface (GUI) of the application/service.

In the following discussion, an example environment is first described that is operable to employ techniques described herein. Next, a section entitled "Example Implementation Scenarios" describes some implementation scenarios involving techniques discussed herein which may be employed in the example environment as well as in other environments. Following this, a section entitled "Example Procedures" describes some example methods in accordance with one or more implementations. Next, a section entitled "Graphical Indicators of Signal Attributes" describes some example graphical indicators of signal attributes in accordance with one or more implementations. Finally, a section entitled "Example System and Device" describes an example system and device that are operable to employ techniques discussed herein in accordance with one or more embodiments.

Example Environment

FIG. 1 is an illustration of an environment 100 in an example implementation that is operable to employ techniques for indication of wireless signal quality in accordance with one or more implementations. Generally, wireless signal quality pertains to various quality indicators for wireless data communication, such as for wireless broadband data, cellular data, and so forth. Environment 100 includes a client device 102 which can be embodied as any suitable device such as, by way of example and not limitation, a smartphone, a tablet computer, a wearable computing device, a portable computer (e.g., a laptop), a desktop computer, and so forth. One of a variety of different examples of a client device 102 is shown and described below in FIG. 22.

The client device 102 of FIG. 1 is illustrated as including a client wireless module 104, which is representative of functionality to enable the client device 102 to communicate wirelessly with other devices and/or entities. The client wireless module 104 is configured to enable data communication via one or more of a variety of different wireless techniques and protocols. Examples of such techniques and/or protocols include wireless cellular communications (e.g. 3G, 4G, Long Term Evolution (LTE), and so forth), near field communication (NFC), short-range wireless connections (e.g., Bluetooth), local area wireless networks (e.g., one or more standards in compliance with IEEE 802.11), wide area wireless networks (e.g., one or more standard in compliance with IEEE 802.16 or 802.22), wireless telephone networks, and so on.

The client device 102 further includes client wireless hardware 106, which is representative of various hardware components that can be employed to enable the client device 102 to communicate wirelessly. Examples of the client wireless hardware 106 include radio transmitters, radio receivers, various types and/or combinations of antennas, impedance matching functionality, and so on. In at least some embodiments, the client device 102 is a multi-radio device that can communicate via different wireless technologies and/or protocols. For instance, the client wireless hardware 106 may include multiple antennas that are individually configured for different wireless technologies. The client wireless hardware 106, for example, may include a first antenna configured for cellular communications (e.g., Long-Term Evolution (LTE), 5G, and so forth), and a second antenna that is configured for wireless broadband, e.g., WiFi®.

Further included as part of the client device 102 are one or more device drivers 108, which are representative of functionality to enable the client device 102 to interact with various devices, and vice-versa. For instance, the device drivers 108 can enable interaction between various functionalities of the client device 102 (e.g., an operating system, applications, services, and so on) and different devices of the client device 102, such as input/output (I/O) devices. The device drivers 108, for instance, can enable interaction between the client wireless module 104 and the client wireless hardware 106 to enable the client device 102 to transmit and receive wireless signals.

In at least some embodiments, the client device 102 is configured to communicate with other devices and/or entities via a communication application 110. Generally, the communication application 110 is representative of functionality to enable different forms of communication via the client device 102. Examples of the communication application 110 include a voice communication application (e.g., a Voice over Internet Protocol (VoIP) client), a video communication application, a messaging application, a content sharing application, a Unified Communications (UC) application, and combinations thereof. The communication application 110, for instance, enables different communication modalities to be combined to provide diverse communication scenarios.

The environment 100 further includes wireless infrastructure components 112, which are representative of components that implement wireless portions of network(s) 114. In at least some implementations, the wireless infrastructure components 112 may serve as gateways between wired and wireless portions of the network(s) 114. Examples of the wireless infrastructure components 112 include wireless base stations (e.g., wireless access points (WAPs)), routers, gateways, switches, and so forth. Included as part of the wireless infrastructure components 112 is a wireless base station 116, which is representative of an access point for the client device 102 to connect wirelessly to the network 114. The wireless base station 116 may be implemented in various ways, such as a wireless broadband access point, a wireless cellular base station, and so forth.

Generally, the network 114 is representative of a single network or a combination of different interconnected networks. In at least some implementations, the network 114 represents different portions of the radio spectrum that may be leveraged for wireless communication. The network 114, for instance, represents radio spectrum in different frequency bands, such as ultra-high frequency (UHF), super-high frequency (SHF), and so forth. The network 114 may also represent a combination of wireless and wired networks and may be configured in a variety of ways, such as a wide area network (WAN), a local area network (LAN), the Internet, and so forth.

According to various implementations, the client wireless module 104 is configured to perform various aspects of techniques for indication of wireless signal quality discussed herein. For instance, the client wireless module 104 may detect signal strength of wireless signal between the client device 102 and the wireless base station 116, and may detect errors in data communicated between the client device 102 and the wireless base station 116. The client wireless module 104 is configured to utilize such information (e.g., signal strength, data errors, and so forth) to characterize signal quality between the client device 102 and various entities connected to the network 114, such as the endpoints 120. Example ways in which the client wireless module 104 may ascertain and/or characterize wireless signal quality are detailed below.

The client device 102 further includes a web application 118, which is representative of an application that is configured to perform various tasks via connection to the network 114. The web application 118, for instance, can interact with various network-based entities to perform various tasks, such as presentation of web content, interaction with web-based resources, communication with other entities, and so forth. Examples of the web application 118 include a web browser, a web-enabled enterprise application, a web-enabled productivity application, and so forth.

The environment 100 further includes endpoints 120, which are representative of entities with which the client device 102 may exchange data via wireless data transmission. The endpoints 120, for instance, represent other end-user client devices with which the client device 102 may communicate. This is not intended to be limiting, however, and the endpoints 120 may be implemented as other network-connected entities, such as a web server, a cloud-based service, a content sharing service, and so forth.

The endpoints 120 include communication clients 122, which in at least some implementations represent different instances of the communication application 110. Communication between the client device 102 and the endpoints 120, for instance, may be facilitated via communication between the communication application 110 and the communication clients 122.

In at least some implementations, a communication service 124 is leveraged to manage communication between the client device 102 and the endpoints 120. The communication service 124, for instance, is representative of a network service that performs various tasks for management of communication between the client device 102 and the endpoints 120. For example, the communication service 124 can manage initiation, moderation, and termination of communication sessions between the communication application 110 and the communication clients 122.

The environment 100 further includes a quality service 126, which is representative of a network functionality to determine signal quality attributes for different communication paths across the network 114. The quality service 126, for instance, can use various types of error detection techniques to detect errors across different communication paths in the network 114, such as between the client device 102 and the different endpoints 120. Examples of different error detection techniques are detailed below. Based on detected errors, the quality service 126 can notify different entities concerning signal quality. For example, the quality service 126 can notify the client device 102 (e.g., the client wireless module 104) concerning signal quality between the client device 102 and different regions of the network 114, such as the endpoints 120. Example ways in which the quality service 126 may ascertain and/or characterize wireless signal quality are detailed below.

Thus, in at least some implementations, the client device 102 may conserve resources such as battery and processing bandwidth by leveraging the quality service 126 to perform signal quality measurement. Alternatively or additionally, signal quality information received from the quality service 126 may be aggregated with signal quality measurements generated by the client device 102 to generate more complex and/or comprehensive indications of signal quality.

In at least some implementations, the quality service 126 may be implemented and/or managed by the communication service 124. Alternatively, the quality service 126 may represent an independent service that provides signal quality information to a diverse array of entities.

Having described an example environment in which the techniques described herein may operate, consider now a discussion of some example implementation scenarios for indication of wireless signal quality in accordance with one or more embodiments.

Example Implementation Scenarios

Figure 2:
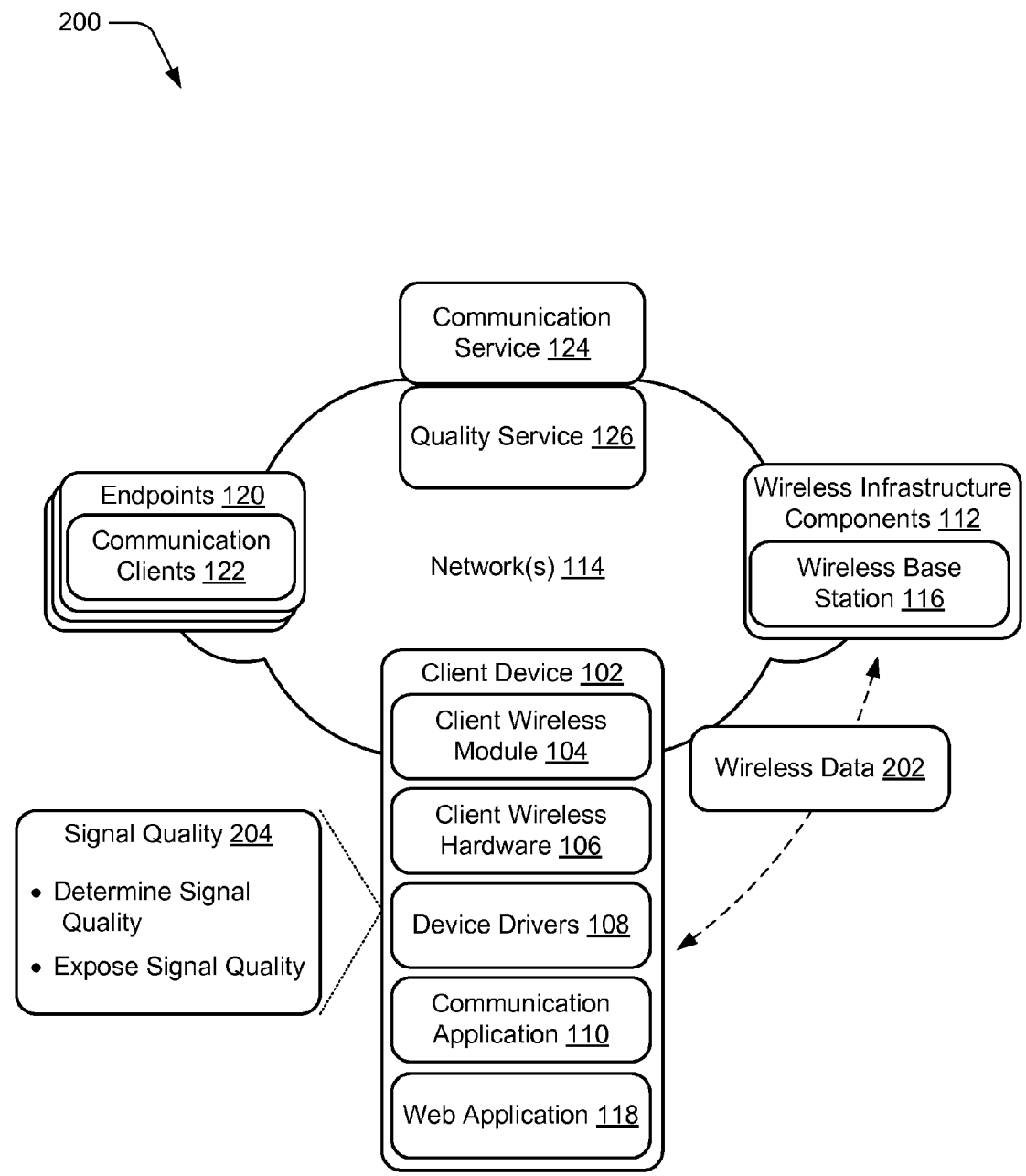
FIG. 2 illustrates an example implementation scenario for techniques for indication of wireless signal quality in accordance with one or more embodiments.

FIG. 2 illustrates an example implementation scenario 200 for techniques for indication of wireless signal quality in accordance with one or more implementations. While the scenario 200 is illustrated as being implemented in the environment 100 introduced above, it is to be appreciated that various aspects of the scenario 200 may be in any other suitable environment.

In the scenario 200, the client device 102 exchanges (e.g., transmits and receives) wireless data 202 via connection to the network 114. The client device 102, for instance, associates with the wireless base station 116, which provides the client device 102 with wireless connectivity to the network 114 to transmit and receive the wireless data 202. As referenced above, the wireless base station 116 may represent any type of infrastructure component that provides wireless connectivity, such as a wireless cellular base station, a wireless broadband access point (e.g., a WiFi® AP), and so forth. The wireless data 202, for instance, may represent wireless cellular data, wireless broadband data, and/or combinations thereof.

The wireless data 202 may be implemented in various ways. For instance, the wireless data 202 may include communication data as part of a communication session between the client device 102 and an endpoint 120. Examples of such a communication session include a voice call (e.g., a wireless cellular call), voice data (e.g., VoIP data), video communication data, and combinations thereof. Alternatively or additionally, the wireless data 202 may include web content, such as web page content, web application 118 content, and so forth. Thus, the wireless data 202 generally represents any type of data that may be communicated wirelessly.

In at least some implementations, the wireless data 202 may be part of a communication session between the client device 102 and an endpoint 120. The wireless data 202, for instance, may be exchanged between the communication application 110 and a communication client 122. The communication service 124 may assist in exchange of the wireless data 202, such as by moderating and/or managing communication of the wireless data 202 between the communication application 110 and a communication client 122.

In another example, the wireless data 202 may include "test data" that is used to determine attributes of data flow between the client device 102 and other entities connected to the network 114, such as an endpoint 120. The communication application 110, for instance, may submit test data to be transmitted to the endpoint 120 for purposes of determining end-to-end signal quality between the client device 102 and the endpoint 120.

Continuing with the scenario 200, the client device 102 ascertains signal quality 204 for the wireless data 202. For instance, the client wireless module 104 ascertains a signal strength value (e.g., an average value) for a wireless connection between the client device 102 and the wireless base station 116, e.g., an RSSI value for the wireless connection. The client wireless module 104 further detects errors that occur during exchange of the wireless data 202, examples of which are detailed elsewhere herein. The signal strength value is then adjusted based on the detected errors to generate the signal quality 204.

In additional or alternative implementation, signal quality may be ascertained based on errors detected in the wireless data 202 and independent of signal strength. Various other ways of detecting signal quality may be employed in accordance with various implementations. In at least some implementations, the signal quality may indicate a trend in signal quality, such as a decrease or increase in signal quality from previously-determined signal quality. Detailed ways of characterizing signal quality based on signal strength and/or detected signal errors are presented below.

According to various implementations, the signal quality 204 can be exposed in various ways. For instance, a visual representation of the signal quality 204 can be displayed on the client device 102. Additionally or alternatively, the signal quality 204 can be communicated to various entities to enable the entities to perform various actions based on the signal quality 204. For instance, the various applications and/or services may be notified of the signal quality such that the applications/services may perform actions based on the signal quality. Further details concerning how the signal quality 204 may be exposed are discussed below.

Figure 3:
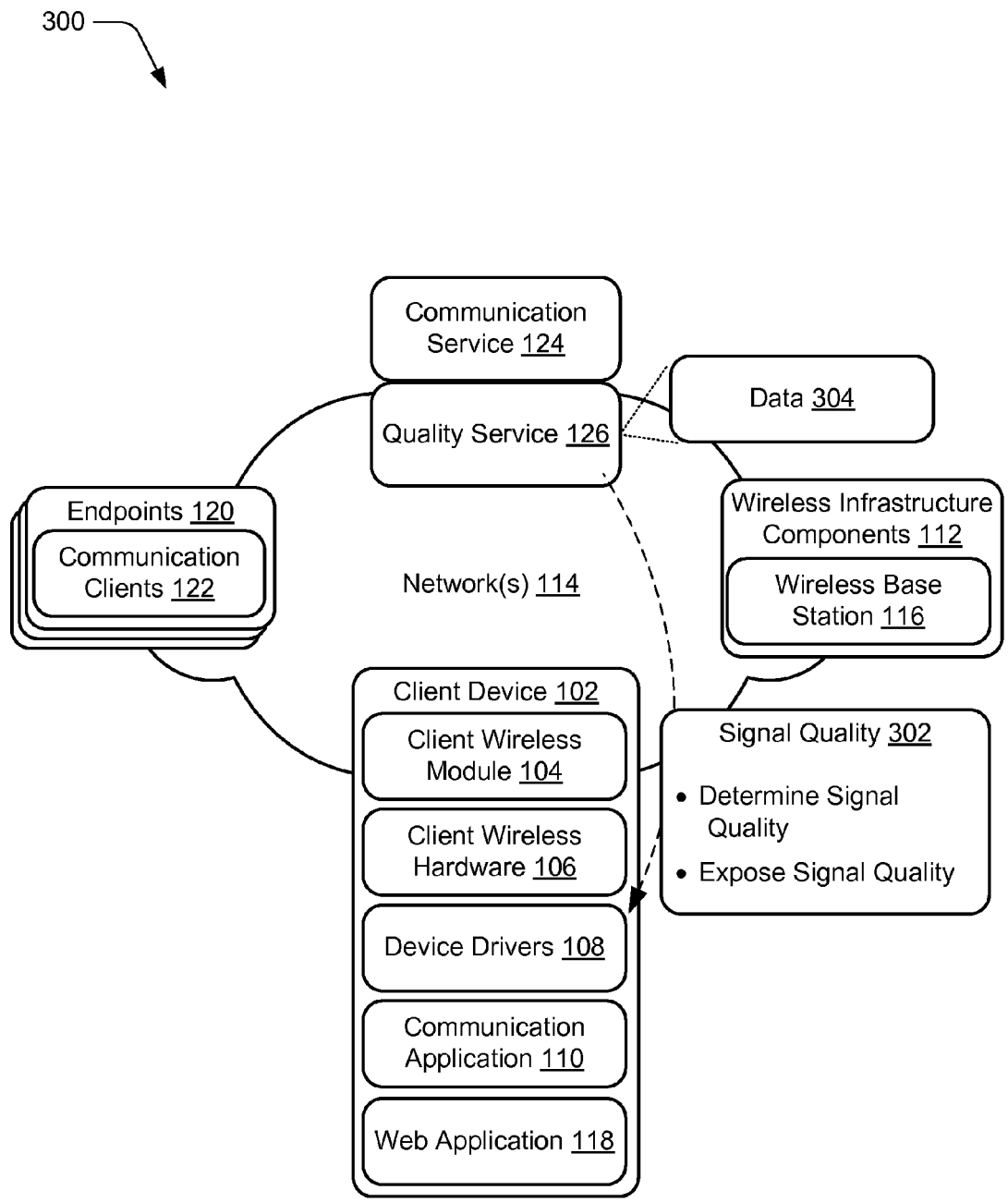
FIG. 3 illustrates an example implementation scenario for techniques for indication of wireless signal quality in accordance with one or more embodiments.

FIG. 3 illustrates an example implementation scenario 300 for indication of wireless signal quality in accordance with one or more implementations. While the scenario 300 is illustrated as being implemented in the environment 100 introduced above, it is to be appreciated that various aspects of the scenario 300 may be in any other suitable environment. The scenario 300 may represent an alternative or additional implementation scenario to the scenario 200 discussed above.

In the scenario 300, the quality service 126 detects signal quality 302 for communication of data 304 in different portions of the network 114. Example ways of ascertaining signal quality are discussed below. For instance, the quality service 126 detects signal quality for wireless connections between the client device 102 and one or more of the endpoints 120. Generally, the signal quality 302 pertains to end-to-end signal quality across wireless and wired portions of the network 114 for wireless communication of the data 304 and over different data routing paths.

The quality service 126 can detect the signal quality 302 in various ways. For instance, different entities connected to the network 114 can communicate various quality-related information concerning the data 304 to the quality service 126, such as signal strength information, quantity and/or rate of errors, bandwidth across different routing paths, and so forth. Examples of such entities that can communicate quality information include the client device 102, the endpoints 120, the network infrastructure components 112, and so forth. Thus, in at least some implementations, the quality service 126 can aggregate signal quality information from a variety of different entities.

Alternatively or additionally, the quality service 126 can implement various quality testing procedures to proactively determine signal quality across different portions of the network 114. For instance, the quality service 126 may cause the data 304 to be communicated to and/or between various entities connected to the network 114. The data 304, for example, may represent test data that replicates various data transmission scenarios, such as upload and/or download of network content, communication sessions between different devices, content streaming to different devices, and so forth.

According to various implementations, the quality service 126 may then gather signal quality information based on transmission of the data 304, such as a network bandwidth experienced during communication of the data 304, errors detected in the data 304, signal strength for the data 304 in different wireless portions of the test data communication path, and so forth. In at least some implementations, the signal quality 302 may indicate a trend in signal quality, such as a decrease or increase in signal quality from previously-determined signal quality over particular portions of the network 114. As discussed above, the signal quality information may be received from various entities connected to the network 114.

Continuing with the scenario 300, the quality service 126 communicates the signal quality 302 to the client device 102. In at least some implementations, the signal quality 302 can be communicated in response to a query from the client device 102 for signal quality information, such as a query for signal quality for a particular routing path across the network. Alternatively or additionally, the quality service 126 may proactively communication the signal quality 302 to the client device 102, e.g., independent of a query from the client device 102 for signal quality information.

As further detailed below, the client device 102 may leverage the signal quality 302 in various ways, such as to notify a user of signal quality, notify an application of signal quality, to adapt wireless settings of the client device 102 based on the signal quality 302, and so forth.

Having discussed an example implementation scenario, consider now some example procedures in accordance with one or more implementations.

Example Procedures

The following discussion describes some example procedures for indication of wireless signal quality in accordance with one or more embodiments. The example procedures may be employed in the environment 100 of FIG. 1, the system 2200 of FIG. 22, and/or any other suitable environment. The procedures, for instance, represent example procedures for implementation of the scenarios described above. In at least some implementations, the steps described for the various procedures can be implemented automatically and independent of user interaction. According to various implementations, the procedures may be performed by the client device 102, the quality service 126, via interaction between the client device 102 and the quality service 126, and so forth.

Figure 4:
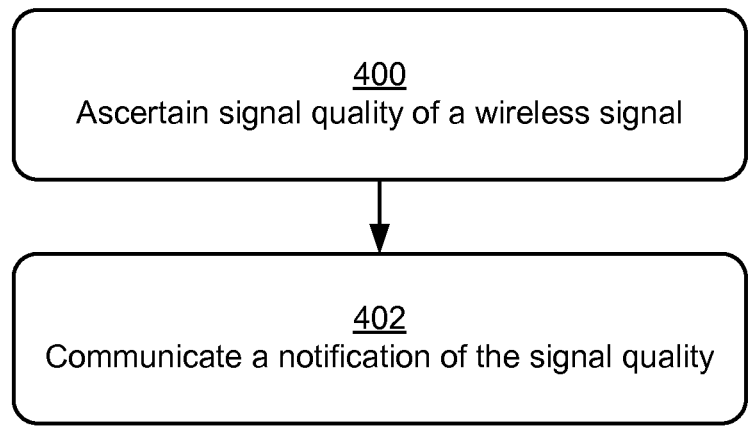
FIG. 4 is a flow diagram that describes steps in a method for notifying various entities of signal quality in accordance with one or more embodiments.

FIG. 4 is a flow diagram that describes steps in a method in accordance with one or more implementations. The method, for instance, describes an example procedure for notifying various entities of signal quality in accordance with one or more implementations.

Step 400 ascertains signal quality of a wireless signal. The signal quality may be ascertained in various ways, such as by the client device 102 (e.g., by the client wireless module 104), by the quality service 126, and so forth. In at least some implementations, the signal quality may indicate a change in signal quality, such as a change from a previous signal quality indicator and/or value. Detailed example ways of ascertaining signal quality are discussed below.

Step 402 communicates a notification of the signal quality. The notification of signal quality, for instance, may be communicated in various ways and to various entities. In at least some implementations, the communication may include an intra-device communication, such as from the client wireless module 104 to the communication application 110. Alternatively or additionally, the communication may be between remote entities, such as from the quality service 126 to the client device 102 (e.g., to the communication application 110), from the client device 102 to the quality service 126 and/or the communication service 124, and so forth. Thus, the signal quality may be determined by various entities and communicated to various other entities.

Figure 5:
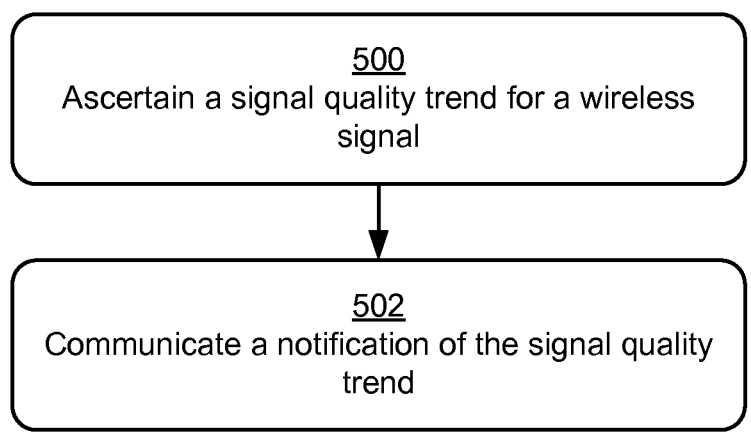
FIG. 5 is a flow diagram that describes steps in a method for notifying various entities of a signal quality trend in accordance with one or more embodiments.

FIG. 5 is a flow diagram that describes steps in a method in accordance with one or more implementations. The method, for instance, describes an example procedure for notifying various entities of a signal quality trend in accordance with one or more implementations.

Step 500 ascertains a signal quality trend for a wireless signal. The signal quality trend may be ascertained in various ways, such as by the client device 102 (e.g., by the client wireless module 104), by the quality service 126, and so forth. In at least some implementations, the signal quality trend may indicate that signal quality of a wireless signal is increasing or is decreasing, such as based on a change from a previous signal quality indicator and/or value. Detailed example ways of ascertaining signal quality are discussed below.

According to various implementations, signal quality may be tracked over a period of time, such as seconds, minutes, hours, and so forth. Thus, a signal quality trend may indicate a variation in current signal quality from historical signal quality, such as an increase in signal quality as compared to previous signal quality, a decrease in signal quality as compared to previous signal quality, and so forth.

Step 502 communicates a notification of the signal quality trend. The notification of signal quality trend, for instance, may be communicated in various ways and to various entities. In at least some implementations, the communication may include an intra-device communication, such as from the client wireless module 104 to the communication application 110. Alternatively or additionally, the communication may be between remote entities, such as from the quality service 126 to the client device 102 (e.g., to the communication application 110), from the client device 102 to the quality service 126 and/or the communication service 124, and so forth. Thus, the signal quality trend may be determined by various entities and communicated to various other entities.

Figure 6:
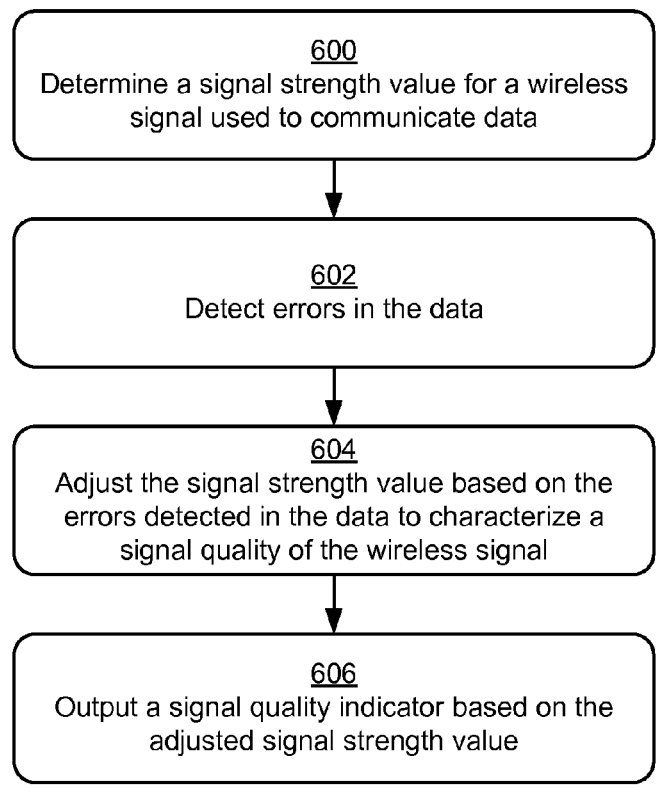
FIG. 6 is a flow diagram that describes steps in a method for outputting a wireless signal quality indicator in accordance with one or more embodiments.

FIG. 6 is a flow diagram that describes steps in a method in accordance with one or more implementations. The method, for instance, describes an example procedure for outputting a signal quality indicator in accordance with one or more implementations.

Step 600 determines a signal strength value for a wireless signal used to communicate data. The signal strength, for instance, corresponds to a signal strength for a wireless signal used to communicate data between a client device and a wireless base station. With reference to the scenario 200, for instance, the signal strength value corresponds to a signal strength of the connection between the client device 102 and the wireless base station 116 for exchange of the wireless data 202. The signal strength value may be determined in various ways, such as via an average RSSI value for the wireless signal, decibels per milliwatt (dBm), watts (W), and so on.

Generally, the data may take a variety of different forms. The data, for instance, may be communication data exchanged as part of a communication session (e.g., a real-time communication session) between the client device 102 and an endpoint 120. Alternatively or additionally, the data may include web content communicated to the client device 102, such as content of a web page. According to various implementations, the data may be communicated according to a variety of data communication protocols, such as Hypertext Transfer Protocol (HTTP), User Datagram Protocol (UDP), Transmission Control Protocol (TCP), and so forth.

Alternatively or additionally, the data may represent data exchanged via a wireless cellular network, such as via connection to a wireless cellular base station.

Step 602 detects errors in the data. The errors can be detected in various ways, examples of which are detailed below.

Step 604 adjusts the signal strength value based on the errors detected in the data to characterize a signal quality of the wireless signal. The signal strength value, for instance, is decreased based on an adjustment value that is calculated based on the errors, such as based on error rate, number of errors, and so forth. An example way of calculating an adjustment value based on errors is detailed below. Alternatively, the signal strength value may be increased based on the errors, e.g., if few errors are detected in the data.

Alternatively or additionally, the signal strength value can be adjusted as a mathematical function of the detected errors. For instance, the signal strength value may be reduced as an inverse function of the detected errors such that an increase in detected errors causes a corresponding decrease in the signal strength value.

Step 606 outputs a signal quality indicator based on the adjusted signal strength value. Generally, the signal quality indicator provides an indication of a quality of data transmission that takes into consideration both wireless signal strength and errors detected in data exchanged via the wireless signal. In at least some implementations, the signal quality indicator is output to indicate a signal quality of the wireless signal relative to the signal strength of the wireless signal.

According to various implementations, the signal quality indicator may be output in various ways. For instance, a visual indication of the signal quality indicator may be displayed, such as on the client device 102. Example implementations for displaying signal quality indicators are discussed below.

Alternatively or additionally, the signal quality indicator may be output as a notification to various functionalities, such as discussed above with reference to FIGS. 4 and 5. For instance, the signal quality indicator may be output to an application involved in exchange of the data. With reference to a communication session, for example, a notification that includes the signal quality indicator may be communicated to an application and/or service involved in the communication session, e.g., to the communication application 110, the communication client 122, the communication service 124, and so forth. The application and/or service may perform various actions based on the notification, such as implementing measures to compensate for poor signal quality, to improve signal quality, to optimize device performance, and so forth.

In at least some implementations, signal quality can be characterized based on detected errors and independent of signal strength. For instance, consider the following example procedure.

Figure 7:
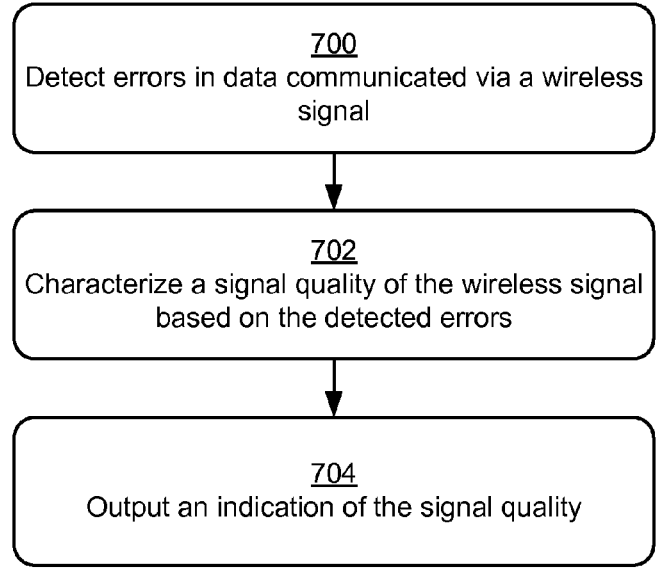
FIG. 7 is a flow diagram that describes steps in a method for generating a signal quality indicator based on errors detected in wireless signal in accordance with one or more embodiments.

FIG. 7 is a flow diagram that describes steps in a method in accordance with one or more implementations. The method describes an example procedure for generating a signal quality indicator based on errors detected in wireless signal in accordance with one or more implementations.

Step 700 detects errors in data communicated via a wireless signal. In at least some implementations, the errors can be detected in data that is received, and/or based on data that is transmitted for receipt by another device. Example ways of detecting and quantifying errors in data are detailed below.

Step 702 characterizes a signal quality of the wireless signal based on the detected errors. The signal quality, for instance, is characterized based on various error-related conditions, example of which are discussed below. In at least some implementations, the signal quality is characterized based on the detected errors and independent of a detected signal strength, e.g., independent of an RSSI for the wireless signal. An example way of characterizing signal quality based on detected errors is discussed below.

Step 704 outputs an indication of the signal quality. The indication of signal quality can be output in various way, such as a visual indication, an audible indication, and so forth. The signal quality indication, for instance, may be output as a notification to various functionalities, such as discussed above with reference to FIGS. 4 and 5. Example indicia of signal quality are illustrated in the accompanying FIGS. that are discussed below.

Figure 8:
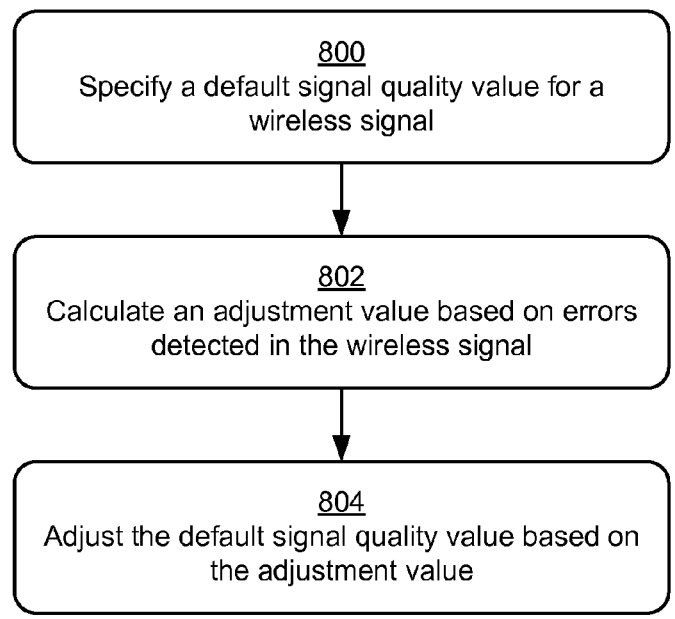
FIG. 8 is a flow diagram that describes steps in a method for characterizing wireless signal quality based on errors detected in wireless signal in accordance with one or more embodiments.

FIG. 8 is a flow diagram that describes steps in a method in accordance with one or more implementations. The method describes an example procedure for characterizing wireless signal quality based on errors detected in the wireless signal in accordance with one or more implementations.

Step 800 specifies a default signal quality value for a wireless signal. For instance, a default signal quality value can be specified that corresponds to a high quality wireless signal, e.g., a wireless signal in which few or no errors are detected.

Step 802 calculates an adjustment value based on errors detected in the wireless signal. The adjustment value, for instance, is calculated based on the errors detected in the wireless signal, such as based on error rate, number of errors, and so forth. An example way of calculating an adjustment value based on errors is detailed below.

Step 804 adjusts the default signal quality value based on the adjustment value. For instance, the default signal quality value is reduced based on the adjustment value, such as by subtracting the adjustment value from the default signal quality value to derive an adjusted signal quality value that characterizes the quality of the wireless signal.

Alternatively or additionally, the default signal quality value can be adjusted as a mathematical function of the adjustment value. For instance, the default signal quality value may be reduced as an inverse function of the adjustment value such that an increase in detected errors causes a corresponding decrease in the default signal quality value.

Figure 9:
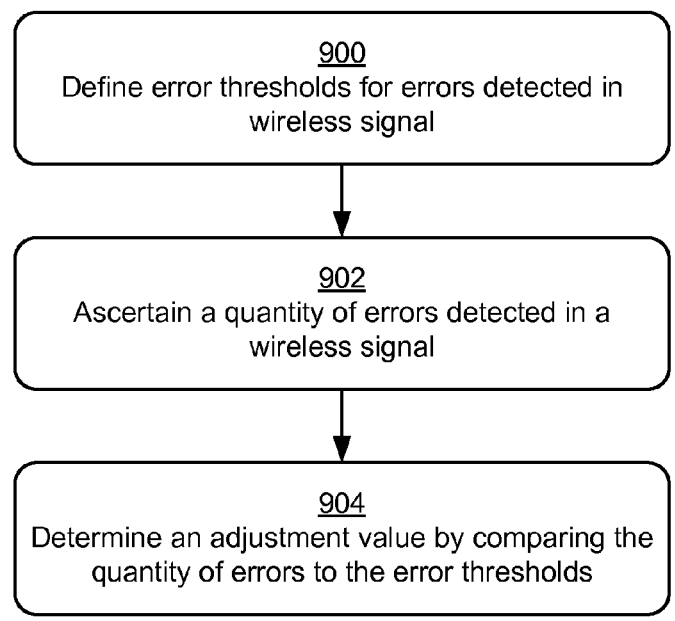
FIG. 9 is a flow diagram that describes steps in a method for determining an adjustment value for adjusting a signal quality indicator in accordance with one or more embodiments.

FIG. 9 is a flow diagram that describes steps in a method in accordance with one or more implementations. The method describes an example procedure for determining an adjustment value for adjusting a signal quality indicator in accordance with one or more implementations.

Step 900 defines error thresholds for errors detected in wireless signal. The error thresholds, for instance, each correspond to different quantities of errors detected in wireless signal, such as different bit error counts, different bit error rates, different numbers of retransmissions, and so forth.

Step 902 ascertains a quantity of errors detected in a wireless signal. Examples ways of detecting and quantifying errors in wireless signal are detailed throughout this discussion. The errors, for instance, can be quantified as a number of errors detected over a particular period of time, as a bit error rate, and so forth.

Step 904 determines an adjustment value by comparing the quantity of errors to the error thresholds. For instance, a first error threshold may correspond to a range of zero to x number of errors, a second error threshold may correspond to y number of errors, a third error threshold may correspond to z number of errors, and so forth, with x, y, z representing different discrete error quantities, such as number of bit errors, bit error rates, and so forth. Further, the first error threshold may correspond to an adjustment value of zero (0), the second error threshold may correspond to an adjustment value of one (1), the third error threshold may correspond to an adjustment value of two (2), and so forth. For instance, if the quantity of errors is x or fewer, the adjustment value is determined to be zero (0). If the quantity of errors is at least x but less then y, the adjustment value is one (1). If the quantity of errors is at least y but less than z, the adjustment value is two (2), and so on.

Thus, in at least some implementations, a set of error thresholds are defined such that as errors increase past respective thresholds, an adjustment value for adjusting a signal quality indicator increases. Correspondingly, as errors decrease past respective thresholds, an adjustment value decreases. Example ways for leveraging an adjustment value for characterizing wireless signal quality are detailed elsewhere herein.

Figure 10:
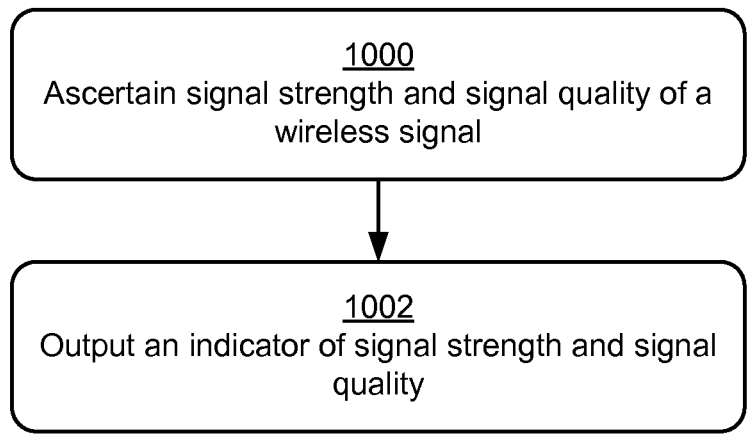
FIG. 10 is a flow diagram that describes steps in a method for presenting indicia of signal strength and signal quality in accordance with one or more embodiments.

FIG. 10 is a flow diagram that describes steps in a method in accordance with one or more implementations. The method describes an example procedure for presenting indicia of signal strength and signal quality in accordance with one or more implementations.

Step 1000 ascertains signal strength and signal quality of a wireless signal. Signal strength, for instance, corresponds to an RSSI for the wireless signal. According to various implementations, signal quality is ascertained based on errors detected in data that is communicated via the wireless signal and/or other indicia of signal quality. Example ways for characterizing signal quality are detailed elsewhere herein.

Step 1002 outputs an indicator of signal strength and signal quality. The indicator, for instance, can be output as a combined representation of both signal strength and signal quality. Alternatively or additionally, the indicator can include separate indicia of signal strength and signal quality. According to various implementations, the indicator can be output in various ways, such as via display of a graphical indicator, an audible indicator, and so forth. Examples of indicators of signal strength and signal quality are discussed below. The indicator of signal strength and signal quality, for instance, may be output as a notification to various functionalities, such as discussed above with reference to FIGS. 4-7.

Errors in wireless data can be detected and/or characterized in various ways. For instance, consider the following example procedures.

Figure 11:
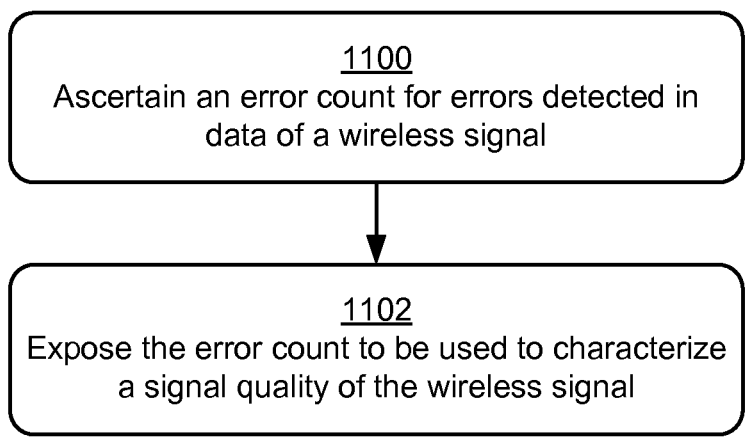
FIG. 11 is a flow diagram that describes steps in a method for characterizing errors in wireless data in accordance with one or more embodiments.

FIG. 11 is a flow diagram that describes steps in a method in accordance with one or more implementations. The method describes an example procedure for characterizing errors in wireless data in accordance with one or more implementations.

Step 1100 ascertains an error count for errors detected in data of a wireless signal. The error count may be specified in various ways, such as a number of bit errors, a number of packet errors, jitter values, packet delay, number of bits and/or packets lost, and so forth. In at least some implementations, the error count may be ascertained as a number of errors over a discrete period of time, such as over 0.5 seconds, 1 second, 5 seconds, and so forth.

The error count can be ascertained in various ways. For instance, the error count can be determined based on output from a cyclical redundancy check (CRC) performed on the data. As the client device 102 receives the data, for example, the client device 102 can perform a CRC procedure on the data to detect errors. Output of the CRC indicates a number of errors detected, e.g., over a particular period of time.

As another example, error count can be based on errors detected based on error correction coding, such as forward error correction (FEC) performed on the data. Examples of FEC that may be applied to the data include hard-decision FEC, soft-decision FEC and so forth. Output from FEC of the data, for instance, specifies a number of errors detected and/or corrected in the data via FEC. For instance, data that is transmitted in a wireless signal can be encoded prior to transmission (e.g., using a block code, a convolution code, and so on) to enable a receiving device to determine whether errors are present in the data when it is received. Further, such encoding can enable a receiving device to quantify how many errors are present, such as a number of flipped bits, a number of omitted bits, and so on. Correction coding may also enable a receiving device to correct such errors.

In at least some implementations, multiple different types of encoding may be employed for data that is to be transmitted wirelessly. For instance, data may be encoded using FEC encoding, and the resulting FEC-encoded data may then be encoded using CRC encoding. A receiving device (e.g., the client device 102) can decode the data first using a CRC decoder, and then an FEC decoder. This can enable a receiving device to determine overall data integrity based on attempted CRC decoding, and to quantify and/or repair data errors via FEC decoding.

Step 1102 exposes the error count to be used to characterize a signal quality of the wireless signal. The error count on its own, for instance, can be used to characterize a signal quality of the wireless signal. Alternatively or additionally, a signal strength value for the wireless signal can be adjusted based on the error count, such as discussed above. As yet another example implementation, the error count can be used to generate an adjustment value for adjusting an indicator of signal quality, such as discussed above with reference to FIGS. 6-9. In at least some implementations, the error count can be communicated to an application (e.g., the communication application 110 and/or the web application 118) to enable the application to perform various actions based on the error count. The error count, for instance, may be output as a notification to various functionalities, such as discussed above with reference to FIGS. 4-7.

Figure 12:
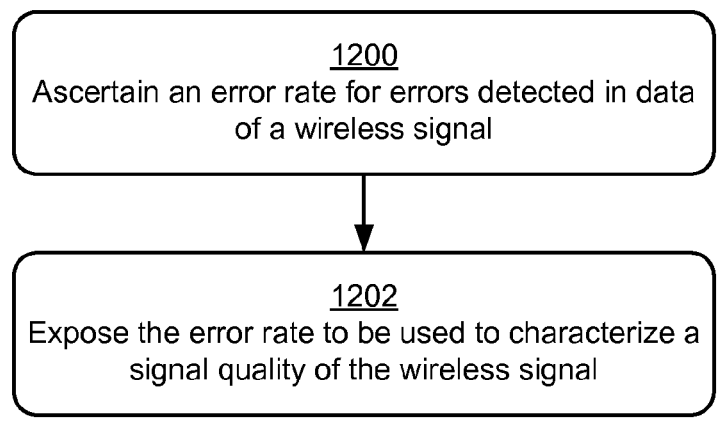
FIG. 12 is a flow diagram that describes steps in a method for characterizing errors in wireless data in accordance with one or more embodiments.

FIG. 12 is a flow diagram that describes steps in a method in accordance with one or more implementations. The method describes an example procedure for characterizing errors in wireless data in accordance with one or more implementations.

Step 1200 ascertains an error rate for errors detected in data of a wireless signal. The error rate, for instance, may be based on a number of errors detected over a period of time, such as bit error rate (BER), packet error rate (PER), and so forth. Error rate may be detected in various ways, such as based on errors detected via CRC performed on the data.

Step 1202 exposes the error rate to be used to characterize a signal quality of the wireless signal. The error rate on its own, for instance, can be used to characterize a signal quality of the wireless signal. Alternatively or additionally, a signal strength value for the wireless signal can be adjusted based on the error rate, such as discussed above. As yet another example implementation, the error rate can be used to generate an adjustment value for adjusting an indicator of signal quality, such as discussed above with reference to FIGS. 6-9. In at least some implementations, the error rate can be communicated to an application (e.g., the communication application 110 and/or the web application 118) to enable the application to perform various actions based on the error rate.

Figure 13:
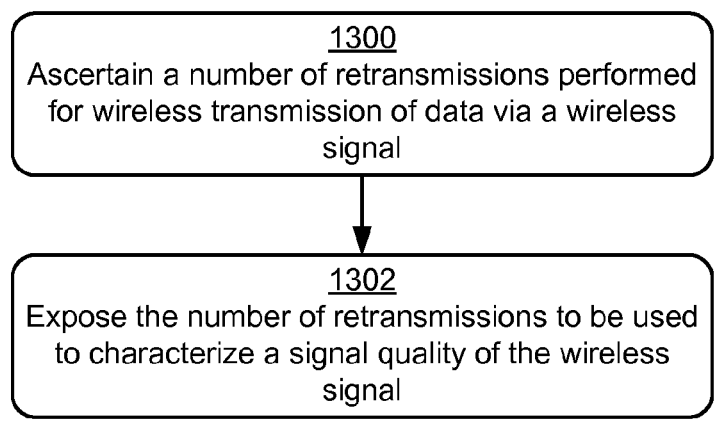
FIG. 13 is a flow diagram that describes steps in a method for characterizing errors in data transmission in wireless data in accordance with one or more embodiments.

FIG. 13 is a flow diagram that describes steps in a method in accordance with one or more implementations. The method describes an example procedure for characterizing errors in data transmission in wireless data in accordance with one or more implementations.

Step 1300 ascertains a number of retransmissions performed for wireless transmission of data via a wireless signal. The retransmissions, for instance, are performed based on techniques for automatic repeat request (ARQ) that enable data transmission to be repeated when it is determined that data transmission failed, e.g., that data did not reach a recipient and/or that data was corrupted when received by a recipient.

The client device 102, for instance, may retransmit wireless data that is not acknowledged by a receiving device, such as based on data for which an acknowledgement (ACK) is not received within an ACK timeout period. According to various implementations, the client device 102 may track a number of retransmissions that occur during a particular data session and/or over a particular network connection and over a particular period of time.

Step 1302 exposes the number of retransmissions to be used to characterize a signal quality of the wireless signal. The number of retransmissions on its own, for instance, can be used to characterize a signal quality of the wireless signal. Alternatively or additionally, a signal strength value for the wireless signal can be adjusted based on the number of retransmissions. As yet another example implementation, the number of retransmissions can be used to generate an adjustment value for adjusting an indicator of signal quality, such as discussed above with reference to FIGS. 6-9. In at least some implementations, the number of retransmissions can be communicated to an application (e.g., the communication application 110 and/or the web application 118) to enable the application to perform various actions based on the error rate.

Figure 14:
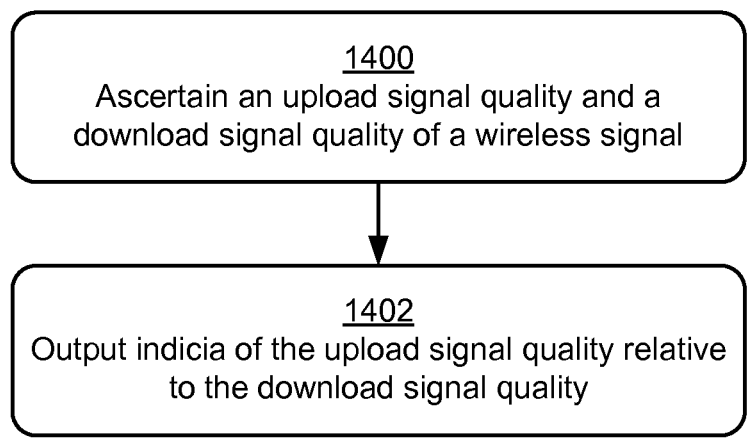
FIG. 14 is a flow diagram that describes steps in a method for characterizing download signal quality and upload signal quality of a wireless signal in accordance with one or more embodiments.

FIG. 14 is a flow diagram that describes steps in a method in accordance with one or more implementations. The method describes an example procedure for characterizing download signal quality and upload signal quality of a wireless signal in accordance with one or more implementations.

Step 1400 ascertains an upload signal quality and a download signal quality of a wireless signal. For instance, techniques discussed above for characterizing signal quality of a wireless signal can be applied to data that is downloaded to a device, and separately to data that is uploaded from the device. Thus, separate signal quality values can be determined for data that is downloaded and data that is uploaded.

Step 1402 outputs indicia of the upload signal quality relative to the download signal quality. The indicia, for instance, contrast the upload signal quality with the download signal quality. The indicia may be output in various ways, such as via graphical indicia, audio indicia, and so forth. An example of such indicia is discussed below with reference to FIG. 20.

Figure 15:
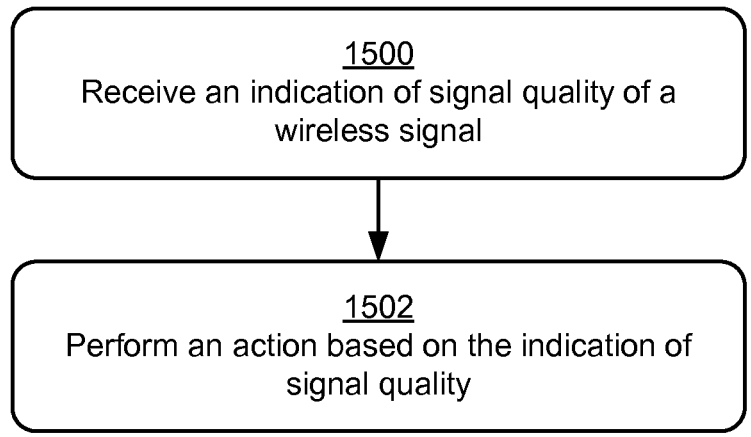
FIG. 15 is a flow diagram that describes steps in a method for performing an action based on an indication of signal quality of a wireless signal in accordance with one or more embodiments.

FIG. 15 is a flow diagram that describes steps in a method in accordance with one or more implementations. The method describes an example procedure for performing an action based on an indication of signal quality of a wireless signal in accordance with one or more implementations.

Step 1500 receives an indication of signal quality of a wireless signal. The indication, for example, may be received by various entities, such as the client device 102 (e.g., from the quality service 126), the communication application 110, the communication service 124, the quality service 126 (e.g., from devices connected to the network 114), and so forth. In at least some implementations, the indication of signal quality may be received as intra-device communication, such as by the communication application 110 from the client wireless module 104.

Generally, the indication of signal quality may take various forms. For instance, the indication may be descriptive in nature, such as a general indication that signal quality is high, medium, low, poor, and so forth. Alternatively or additionally, the indication may be quantitative (e.g., a quality value), such as based on signal strength (e.g., RSSI), error count and/or error rate, numbers of retransmissions, and so forth. As yet another implementation, the indication of signal quality may indicate a signal quality trend, such as an indication that signal quality is decreasing, is increasing, and so forth. These various indications of signal quality, as well as other indications, may be combined in different ways within the spirit and scope of the implementations discussed herein.

Step 1502 performs an action based on the indication of signal quality. The action, for instance, depends on whether the indication of signal quality indicates problems with signal quality (e.g., that signal quality is trending lower), that signal quality is good or high (e.g., is trending higher), and so forth. For instance, consider the following examples actions.

Low Signal Quality: Various actions can be taken in response to an indication of low signal quality, such as an indication of a trend of decreasing signal quality.

(1) User Notification—a notification of low signal quality may be presented to a user, such as a visual and/or audible notification that signal quality is decreasing. For instance, the client wireless module 104 and/or the communication application 110 may present a notification of low signal quality. Examples of such notifications are discussed below.

(2) User Suggestion—various suggestions and/or instructions may be provided to a user to attempt to increase signal quality, such as via visual and/or audible suggestions. Examples of such suggestions include a suggestion to physically move in a particular direction, such as closer to a signal source and/or away from a signal obstruction, e.g., to move closer to the wireless base station 116. Another suggestion may request that a user turn on their wireless broadband radio to connect to a local wireless broadband network, e.g., in a case where is a user is communicating data via a wireless cellular connection.

(3) Signal Quality Correction—various actions may be taken to attempt to correct for low signal quality, such as to attempt to increase signal quality. For instance, the communication application 118, the communication service 124, and/or the quality service 126 can implement corrective procedures to attempt to increase signal quality, such as to decrease signal errors in data communicated via a wireless signal.

The communication application 118, for example, may implement error correction procedures independent of and/or in addition to error correction procedures performed by other components of the client device 102, such as the client wireless module 104 and/or the client wireless hardware 106. For instance, the communication application 118 may alter (e.g., reduce) its codec bitrate used to encode media data to reduce errors that are introduced into wireless data transmitted over a low quality wireless signal. In at least some implementations, reducing the codec bitrate enables more robust error correction coding to be implemented to correct errors in signal data. Further, a lower codec bitrate typically utilizes less bandwidth, which may allow for a narrower channel and a narrower channel filter that may improve a signal-to-noise ratio over the wireless channel, and/or provide more time to average out noise over a bit period.

As another example, the communication application 118 may implement its own FEC and/or CRC on wireless data to correct errors in wireless data. As referenced above, error correction procedures performed by the application 118 may be independent of procedures performed by other layers, such as error correction procedures perform at the physical layer (PHY) of the client device 102. The error correction procedures, for instance, may be performed at the application layer and independent of procedures performed at other layers.

As an alternative or additional implementation, the communication application 118 may notify another component that wireless signal quality is poor and request that the component perform a corrective procedure. For instance, the communication application 118 may notify the client wireless module 104 and/or the client wireless hardware 106 that signal quality is poor, and that a corrective procedure is to be implemented by the notified component. The notification, for example, may request that an error correction procedure be applied and/or modified, such as applying CRC and/or FEC, increasing an existing FEC rate, and so forth. In at least some implementations, the communication application 118 may communicate such a notification down the stack to lower layer components, such as a link layer component of the client device 102.

(4) Service Notification—a notification of low signal quality may be communicated to a network service, such as the communication service 124 and/or the quality service 126. For instance, the client wireless module 104 and/or the communication application 110 communicate the notification of low signal quality. As referenced above, the quality service 126 may utilize such notifications to track signal quality across different portions of the network 114, and to propagate signal quality information among entities connected to the network 114.

High Signal Quality: Various actions can be taken in response to an indication of high signal quality, such as an indication of a trend of increasing signal quality.

(1) User Notification—a notification of high signal quality may be presented to a user, such as a visual and/or audible notification that signal quality is increasing. For instance, the client wireless module 104 and/or the communication application 110 may present a notification of high signal quality. According to various implementations, this enables a user to note that a particular location (e.g., a geographical location, a network-based location, and so forth) is associated with high signal quality such that the user may revisit the location to experience high signal quality.

(2) Performance Optimization—various wireless performance optimization procedures may be implemented based on ascertaining that high signal quality is available. For instance, a media codec rate may be increased to increase quality of media data (e.g., voice, video, and so forth) communicated wirelessly. As another example, wireless transmission power used by the client device 102 may be reduced to conserve battery life.

(3) Service Notification—a notification of high signal quality may be communicated to a network service, such as the communication service 124 and/or the quality service 126. For instance, the client wireless module 104 and/or the communication application 110 communicate the notification of high signal quality. As referenced above, the quality service 126 may utilize such notifications to track signal quality across different portions of the network 114, and to propagate signal quality information among entities connected to the network 114.

Figure 16:
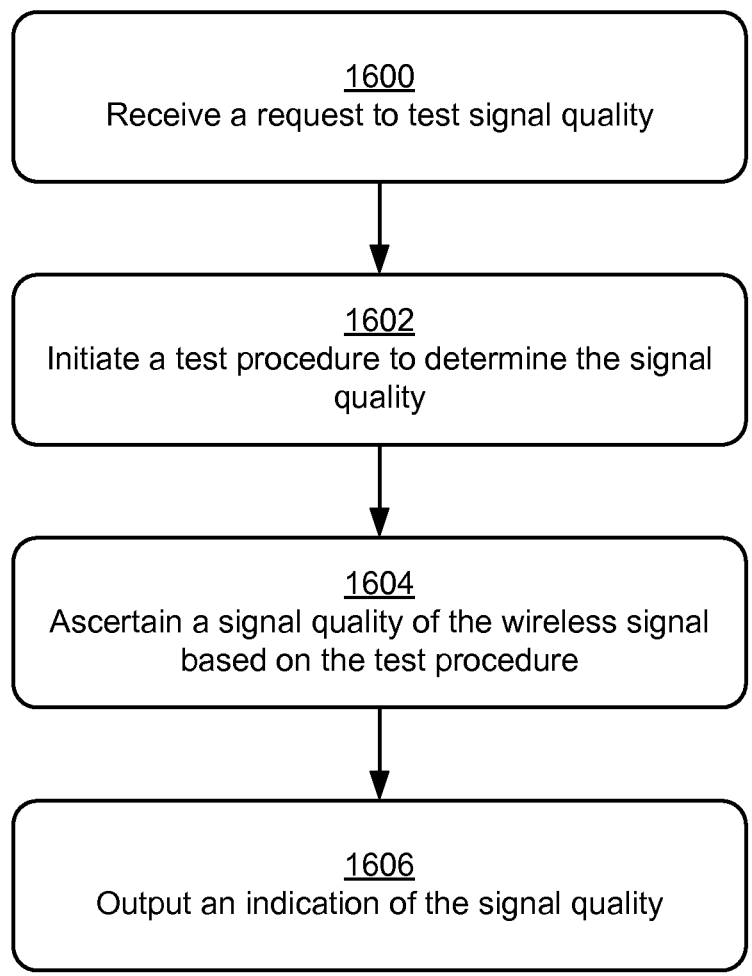
FIG. 16 is a flow diagram that describes steps in a method for testing signal quality of a wireless signal in accordance with one or more embodiments.

FIG. 16 is a flow diagram that describes steps in a method in accordance with one or more implementations. The method describes an example procedure for testing signal quality of a wireless signal in accordance with one or more implementations.

Step 1600 receives a request to determine a signal quality of a wireless signal. The request, for instance, can be received in response to various events. For instance, a user may expressly request that signal quality be ascertained between the user's device and one or more other devices, such as between the client device 102 and one or more of the endpoints 120. Alternatively or additionally, the request may be initiated in response to a scheduled communication event, such as an online meeting and/or other communication event that is scheduled via a calendar application and/or other scheduling functionality. A variety of other events may initiate a request to determine signal quality within the spirit and scope of the implementations discussed herein.

Step 1602 initiates a test procedure to determine the signal quality. For instance, test data may be communicated between various devices, such as between the client device 102 and an endpoint 120. The test data may take various forms, such as media data (e.g., voice data, video data, content data), and so forth.

Step 1604 ascertains a signal quality of the wireless signal based on the test procedure. Various ways for determining signal quality are described above, and include determining signal strength, errors detected in data transmitted via a wireless signal, and so forth.

Step 1606 outputs an indication of the signal quality. Various ways for outputting an indication of signal quality are detailed elsewhere herein, and include displaying a visual indicator of signal quality, communicating a notification of signal quality, and so forth.

Thus, the procedure described above presents an example way for testing signal quality over different portions of a network, e.g., between two or more different devices. In at least some implementations the procedure may be performed independent of a real-time communication session, e.g., independent of user interaction during the test procedure.

According to various implementations, the methods described above as well as other procedures described herein can be performed in real-time to provide a dynamic indication of signal quality. For instance, various procedures can respond to changes in signal quality characteristics to dynamically adjust indications of signal strength and signal quality. In at least some implementations, the procedures can be periodically and/or continuously performed to provide an indication of current signal quality.

Having discussed some example procedures, consider now a discussion of some example graphical indicators of signal attributes in accordance with one or more implementations.

Graphical Indicators of Signal Attributes

This section describes some example graphical indicators of signal attributes in accordance with one or more implementations. The described graphical indicators are not to be construed as limiting, and are presented for purpose of example only.

Figure 17:
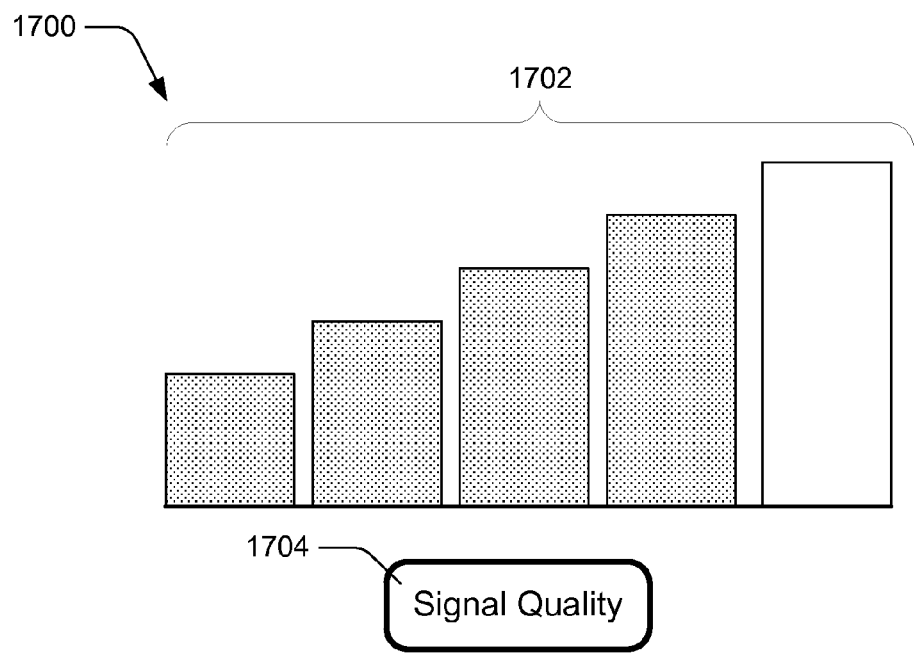
FIG. 17 illustrates an example signal strength indicator in accordance with one or more embodiments.

FIG. 17 illustrates a signal strength indicator 1700 in accordance with one or more implementations. The signal strength indicator 1700, for instance, represents a signal strength values ascertained in various ways, examples of which are discussed above.

The signal strength indicator 1700 includes strength bars 1702, which can be shaded and/or colored to indicate signal strength of a wireless signal. For instance, the more strength bars 1702 that are shaded and/or colored, the higher the signal strength of a wireless signal represented by the signal strength indicator 1700.

Adjacent to the signal strength indicator 1700 is a signal quality control 1704. According to various implementations, the signal quality control 1704 is displayed near and/or adjacent to the signal strength indicator 1700. This is not to be construed as limiting, however, and the signal quality control 1704 may be displayed separately and/or apart from the signal quality indicator 1700. The signal strength indicator 1700 and the signal quality control 1704 may be displayed in various ways, such as on a display screen of the client device 102, as part of a graphical user interface (GUI) of the communication application 110, the web application 118, a communication client 122, and so forth.

Generally, the signal quality control 1704 is selectable to cause an indicia of signal quality and/or other signal attributes to be presented. For instance, a user can select the signal quality control 1704 via any suitable input technique, examples of which are discussed below with reference to the system 2200. Selection of the signal quality control 1704, for example, causes the signal strength indicator 1700 to be replaced or augmented with an indicator of signal quality for a wireless signal characterized by the signal strength indicator 1700. For instance, consider the following example graphical indicators.

Figure 18:
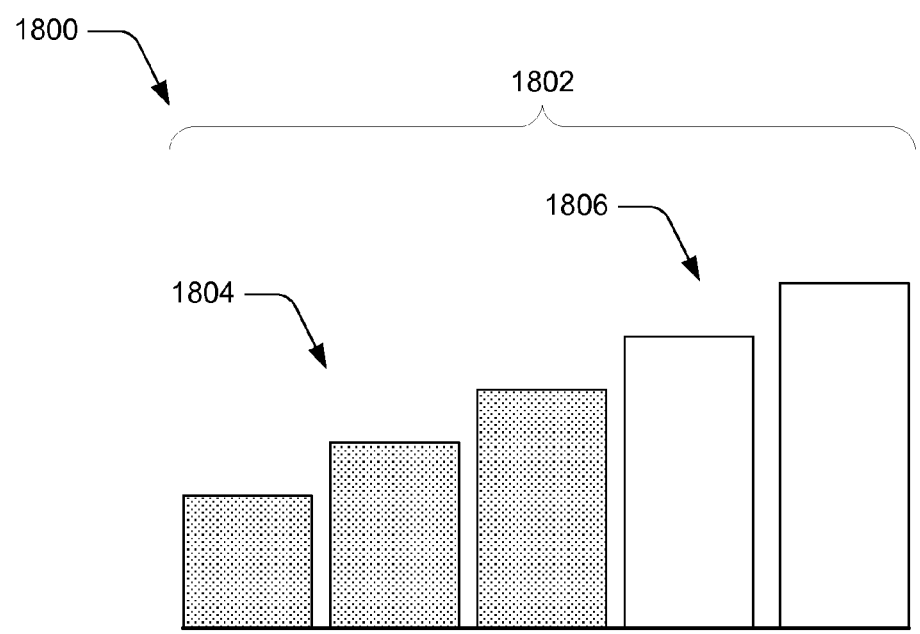
FIG. 18 illustrates an example signal quality indicator in accordance with one or more embodiments.

FIG. 18 illustrates an example signal quality indicator 1800 in accordance with one or more implementations. According to various implementations, the signal quality indicator 1800 represents a graphical indication of signal quality that is output according to techniques discussed above.

In at least some implementations, the signal quality indicator 1800 is output in response to a user selection of the signal quality control 1704 introduced above. This is not intended to be limiting, however, and the signal quality indicator 1800 may be output responsive to one or more of a variety of different events.

According to various implementations, the signal quality indicator 1800 represents a signal quality for a same wireless signal represented by the signal strength indicator 1700. For instance, the signal quality indicator 1800 represents an adjusted signal strength value, such that is adjusted according to techniques discussed above.

The signal quality indicator 1800 includes quality bars 1802, which in turn include shaded quality bars 1804 and non-shaded quality bars 1806. According to various implementations, the shaded quality bars 1804 can be distinguished from the non-shaded quality bars 1806 in various ways, such as based on differing shading levels, differing colors, differing fill patterns, and so forth. Generally, the more of the quality bars 1802 that are shaded, the higher the determined signal quality for a wireless signal. Accordingly, based on the presence of the non-shaded quality bars 1806, it can be seen that the signal strength represented by the signal strength indicator 1700 has been reduced to generate the signal quality indicator 1800.

According to various implementations, the signal quality indicator 1800 can replace the signal strength indicator 1700 in a display region, such as in response to selection of the signal quality control 1704. Alternatively, the signal quality indicator 1800 can be displayed along with the signal strength indicator 1700, such as in different regions of a display, adjacent to one another, and so forth.

Figure 19:
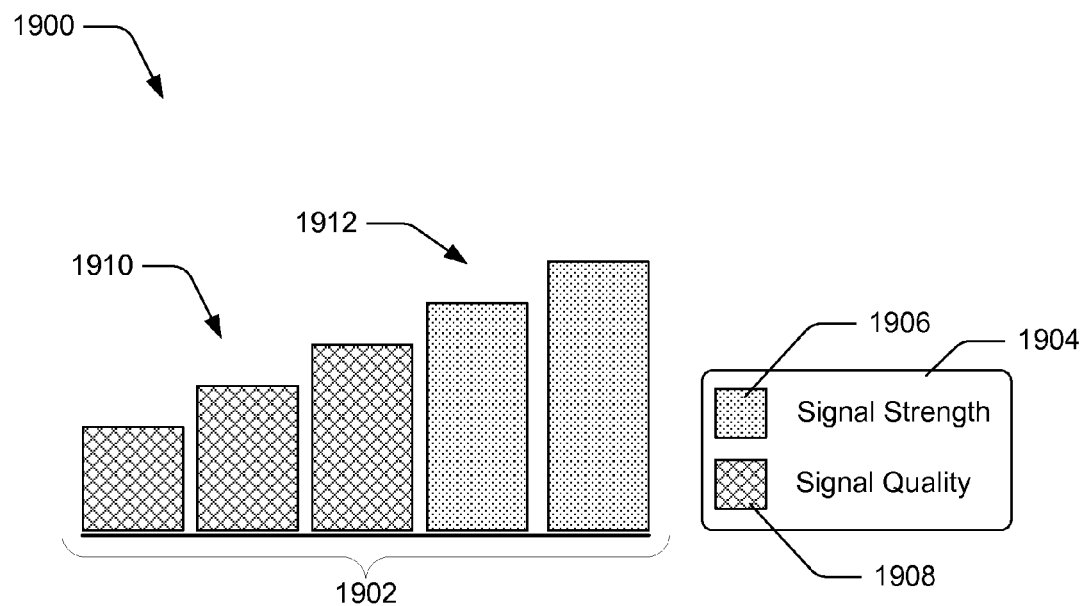
FIG. 19 illustrates an example signal attributes indicator in accordance with one or more embodiments.

FIG. 19 illustrates an example signal attributes indicator 1900 in accordance with one or more implementations. According to various implementations, the signal attributes indicator 1900 represents a graphical indication of signal quality and signal strength that is output according to techniques discussed above.

The signal attributes indicator 1900 includes attributes bars 1902, which can be shaded in various ways to convey attributes of a wireless signal, such as signal strength, signal quality, and so forth. Displayed adjacent to the signal attributes indicator 1900 is an attributes legend 1904, which provides interpretation information for deriving signal attributes from the signal attributes indicator 1900. The attributes legend 1904, for instance, indicates that attributes bars 1902 that include a shading 1906 indicate signal strength of a wireless signal, and attributes bars 1902 that include a shading 1908 indicate a signal quality of the wireless signal.

Accordingly, the attributes bars 1902 include attributes bars 1910 that are shaded according to the shading 1908, and attributes bars 1912 that are shaded according to the shading 1906. Thus, the attributes bars 1910 indicate a signal quality of a wireless signal relative to a signal strength of the wireless signal indicated by the attributes bars 1912. For instance, the attributes bars 1910 indicate that a quality of the wireless signal is less than a strength of the wireless signal.

According to various implementations, the larger attributes bars 1902 are shaded based on the signal attribute(s) with the highest value. For instance, if the signal quality of the wireless signal represented by the signal attributes indicator 1900 is greater than the signal strength, than shading of the attributes bars 1912 relative to the attributes bars 1910 may be reversed from the shading illustrated in FIG. 19.

Thus, the signal attributes indicator 1900 presents an example way of distinguishing different signal attributes from one another, such as for distinguishing signal strength of a wireless signal from signal quality of the wireless signal. Further, the signal attributes indicator 1900 presents an integrated visual representation such that different signal attributes may be combined in a single representation, thus simplifying user understanding and reducing screen space utilized to represent different signal attributes.

Figure 20:
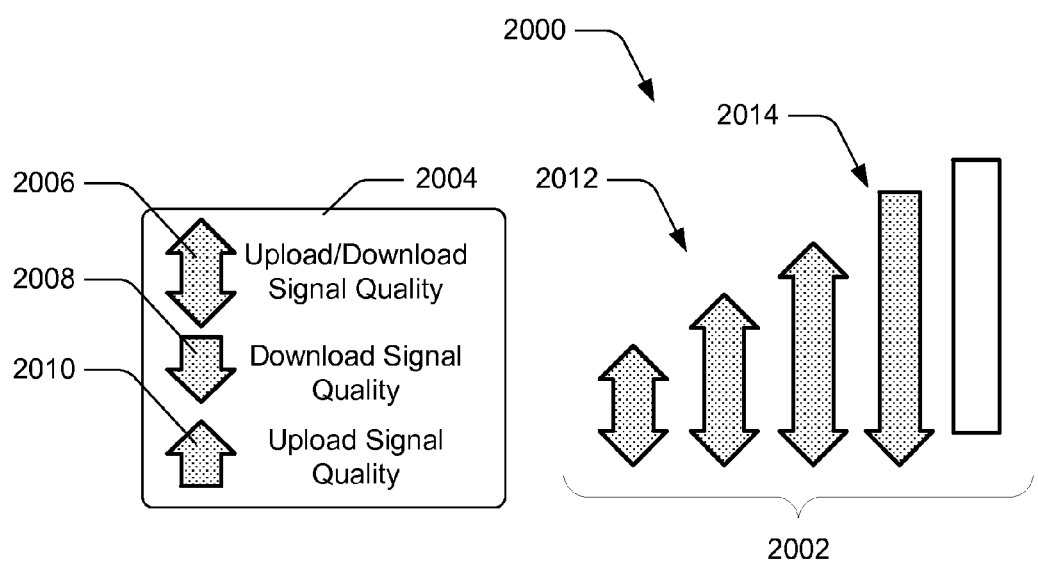
FIG. 20 illustrates an example signal quality indicator in accordance with one or more embodiments.

FIG. 20 illustrates an example signal quality indicator 2000 in accordance with one or more implementations. According to various implementations, the signal quality indicator 2000 represents a graphical indication of signal quality that is output according to techniques discussed above.

The signal quality indicator 2000 includes quality bars 2002, which can be shaded and/or shaped in different ways to indicate different signal quality attributes. Displayed adjacent to the quality bars 2002 is a quality legend 2004, which provides interpretation information for deriving signal quality information from the signal quality indicator 2000. The quality legend 2004, for instance, indicates that a quality bar 2002 that is configured as a double-sided shaded arrow 2006 indicates a relative combined upload and download signal quality of a wireless signal. The quality legend 2004 further indicates that a quality bar 2002 that is configured as a shaded down arrow 2008 indicates a relative download signal quality of a wireless signal. Still further, the quality legend 2004 indicates that a quality bar 2002 that is configured as a shaded up arrow 2010 indicates a relative upload signal quality of a wireless signal.

Accordingly, the quality bars 2002 include quality bars 2012 that are configured as the double-sided shaded arrow 2006, and thus indicate a relative upload and download signal quality of a wireless signal. The quality bars 2002 further include a quality bar 2014 that is configured as the shaded down arrow 2008, and thus indicates a relative download signal quality of the wireless signal. Generally, the larger quality bars 2002 indicate a higher relative quality than the smaller quality bars 2002. Thus, the quality indicator 2000 indicates that a particular wireless signal has a higher relative download signal quality as compared with an upload signal quality for the wireless signal.

Generally, the visual indicators presented above provide example ways of visually presenting information concerning attributes of wireless signal, such as signal strength, signal quality, and so forth. The visual indicators may be presented and combined in various ways to convey different types and combinations of signal attributes. Further, the visual indicators may be presented in response to various events, such as a user request for signal attributes (e.g., via selection of the signal quality control 1704), in response to changes in signal quality, in response to a user launching an application, and so forth.

Figure 21:
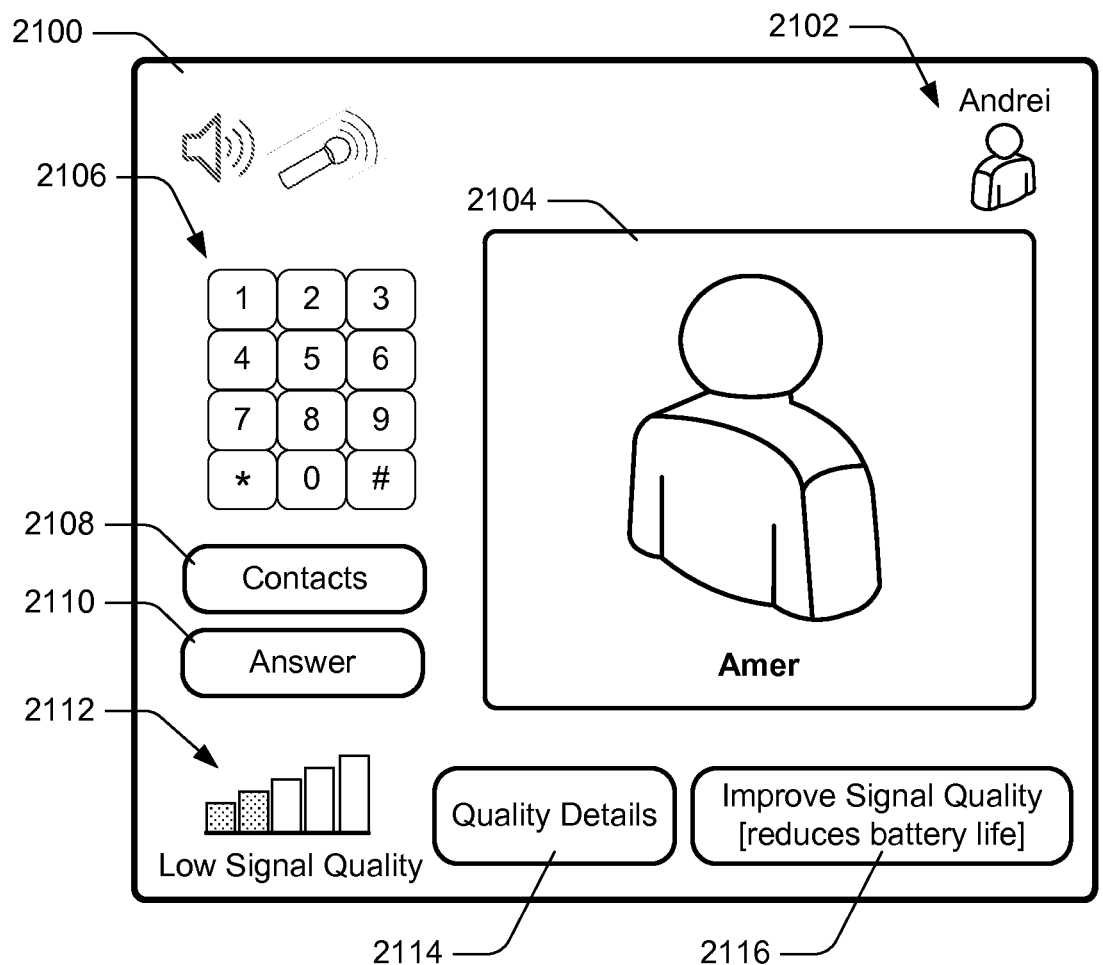
FIG. 21 illustrates an example communications interface in accordance with one or more embodiments.

FIG. 21 illustrates an example communications interface 2100 in accordance with one or more implementations. The communications interface 2100, for instance, represents a graphical user interface (GUI) that may be presented by the communication application 110, the communication service 124, the communication clients 122, and so forth. Generally, the communications interface 2100 may be displayed on the client device 102 as a visual representation of a communication session between different devices, such as between the client device 102 and an endpoint 120. In at least some implementations, the communications interface 2100 represents a primary GUI, e.g., an initial GUI that is presented when an application and/or service is launched.

The communications interface 2100 includes a user identifier 2102 and a participant region 2104. The user identifier 2102 includes identifying information for a user of the communications interface 2100, e.g., a user that is logged into the communication application 110 and that interacts with the communications interface 2100 to participate in communications sessions. A user, for instance, may use a dial control 2106 to enter a phone number and/or other routing information that can be used to initiate a communication session with another user. As another option, the user may select a contacts control 2108 to view and/or search for contacts with which to initiate a communication session. Further, the user may select an answer control 2110 to accept a request from another user to participate in a communication session, e.g., to answer an incoming call.

According to various implementations, the participant region 2104 displays visual representations of one or more users that are participating in a current active communication session. For instance, the participant region 2104 may display user icons (e.g., avatars) that represent individual users and/or groups of users. Alternatively or additionally, the participant region 2104 may display real-time video images of users and/or groups of users that are participating in an active communication session.

The communications interface 2100 further includes a signal quality indicator 2112 that indicates various signal quality attributes for signal used to communicate media as part of a communication session. Examples of the signal quality indicator 2112 are discussed above with reference to FIGS. 17-20. In at least some implementations, the signal quality indicator 2112 indicates a signal quality for an active communication session such as determined according to techniques for indication of wireless signal quality discussed herein. In this particular example, the signal quality indicator 2112 indicates a low signal quality between a device on which the communications interface 2100 is displayed and one or more other devices, e.g., devices associated with users represented in the participant region 2104.

In at least some implementations, the signal quality indicator 2112 can provide a visual indication of signal quality for an active communication session. Alternatively or additionally, the signal quality indicator 2112 may indicate a signal quality between various devices even if a communication session between the devices is not currently active. With reference to the environment 100, for instance, the client wireless module 104 and/or the communication application 110 may initiate a quality test procedure that detects signal quality between the client device 102 and an endpoint 120. Alternatively or additionally, the quality service 126 may initiate such a test procedure. The test procedure, for instance, may include communicating test data between the client device 102 and an endpoint 120, and ascertaining signal quality experienced during communication of the test data. Example ways for ascertaining and testing signal quality are detailed above.

The communications interface 2100 further includes a quality details control 2114 and an improve quality control 2116. According to various implementations, the quality details control 2114 is selectable to cause further details concerning signal quality to be presented, e.g., displayed. For instance, the signal quality indicator 2112 may indicate a general signal quality that takes into account various factors, such as signal strength, signal errors, signal bandwidth, and so forth. Selection of the quality details control 2114 can provide further quality information, such as details concerning the individual factors used to determine the signal quality indicator 2112. For example, different indicators can be presented for signal strength, numbers of errors, error rate, bandwidth, and so forth.

The improve quality control 2116 is selectable to initiate one or more procedures to attempt to improve wireless signal quality, examples of which are detailed above. For instance, selection of the improve quality control 2116 may cause the communication application 110 and/or the quality service 126 to initiate one or more procedures for improving signal quality, such as various error correction procedures, identifying additional and/or alternative wireless channels to utilize for wireless communication, and so forth. In at least some implementations, selection of the improve quality control 2116 may cause suggestions for improving signal quality to be presented to a user, such as visual suggestions, audible suggestions, and so forth. Examples of such suggestions are described above. Optionally, the improve quality control 2116 may indicate various performance and/or system impacts that a quality control procedure may cause, such as reducing battery life, increasing bandwidth usage, incurring additional fees, and so forth.

Accordingly, the communications interface 2100 provides an integrated user experience that enables a user to initiate and participate in communication sessions, and to view signal quality attributes for active and/or prospective communication sessions.

Having discussed some example graphical indicators of signal attributes, consider now a discussion of an example system and device in accordance with one or more embodiments.

Example System and Device

Figure 22:
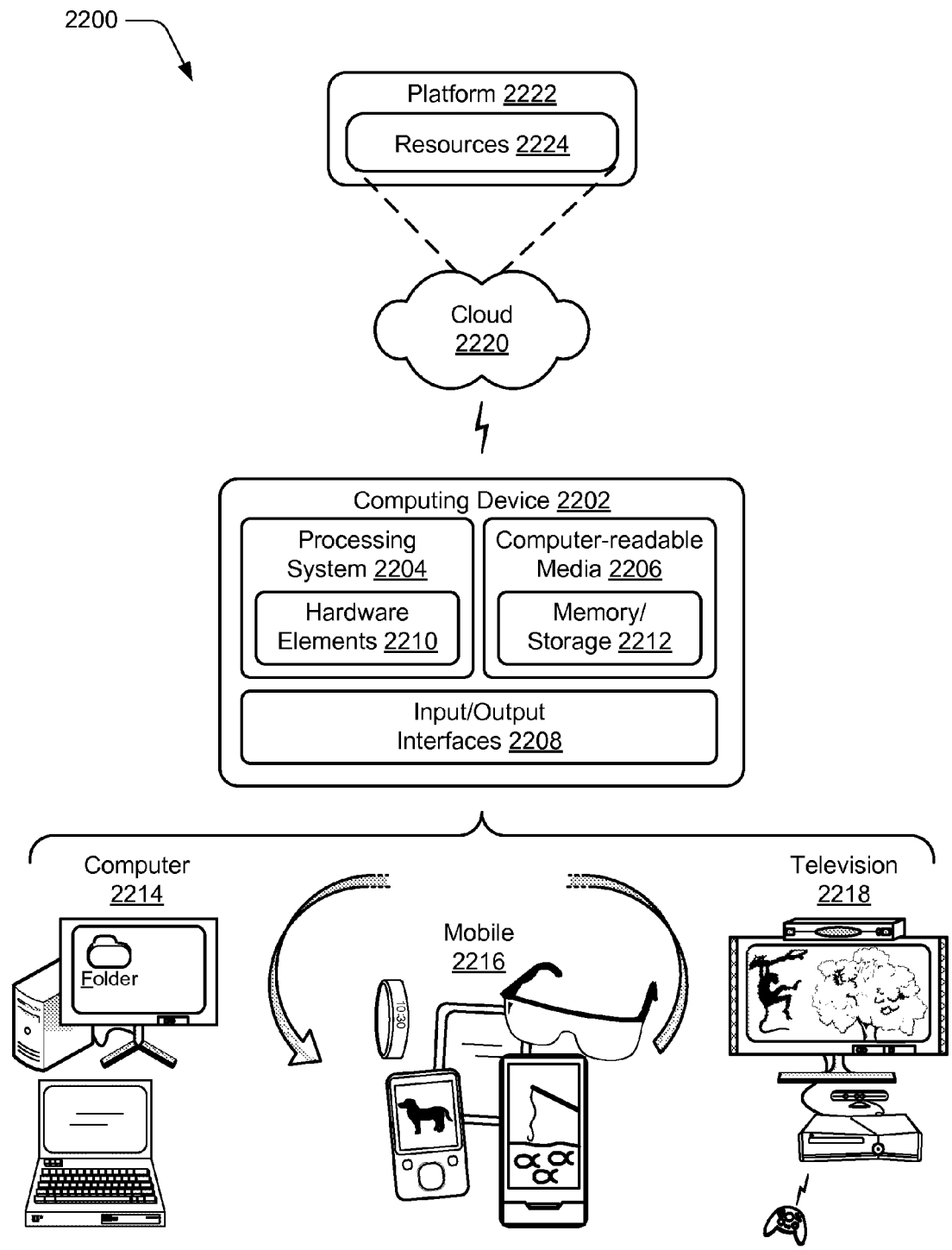
FIG. 22 illustrates an example system and computing device as described with reference to FIG. 1, which are configured to implement embodiments of techniques described herein.

FIG. 22 illustrates an example system generally at 2200 that includes an example computing device 2202 that is representative of one or more computing systems and/or devices that may implement various techniques described herein. For example, the client device 102 discussed above with reference to FIG. 1 can be embodied as the computing device 2202. The computing device 2202 may be, for example, a server of a service provider, a device associated with the client (e.g., a client device), an on-chip system, and/or any other suitable computing device, apparatus, and/or or computing system.

The example computing device 2202 as illustrated includes a processing system 2204, one or more computer-readable media 2206, and one or more I/O Interfaces 2208 that are communicatively coupled, one to another. Although not shown, the computing device 2202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2204 is representative of functionality to perform one or more operations using hardware. Accordingly, the processing system 2204 is illustrated as including hardware element 2210 that may be configured as processors, functional blocks, and so forth. This may include implementation in hardware as an application specific integrated circuit or other logic device formed using one or more semiconductors. The hardware elements 2210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 2206 is illustrated as including memory/storage 2212. The memory/storage 2212 represents memory/storage capacity associated with one or more computer-readable media. The memory/storage 2212 may include volatile media (such as random access memory (RAM)) and/or nonvolatile media (such as read only memory (ROM), Flash memory, optical disks, magnetic disks, and so forth). The memory/storage 2212 may include fixed media (e.g., RAM, ROM, a fixed hard drive, and so on) as well as removable media (e.g., Flash memory, a removable hard drive, an optical disc, and so forth). The computer-readable media 2206 may be configured in a variety of other ways as further described below.

Input/output interface(s) 2208 are representative of functionality to allow a user to enter commands and information to computing device 2202, and also allow information to be presented to the user and/or other components or devices using various input/output devices. Examples of input devices include a keyboard, a cursor control device (e.g., a mouse), a microphone (e.g., for implementing voice and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 2202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2202. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 2202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2210 and computer-readable media 2206 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 2210. The computing device 2202 may be configured to implement particular instructions and/or functions corresponding to the software and/or hardware modules. Accordingly, implementation of modules as an module that is executable by the computing device 2202 as software may be achieved at least partially in hardware, e.g., through use of computer-readable storage media and/or hardware elements 2210 of the processing system. The instructions and/or functions may be executable/operable by one or more articles of manufacture (for example, one or more computing devices 2202 and/or processing systems 2204) to implement techniques, modules, and examples described herein.

As further illustrated in FIG. 22, the example system 2200 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 2200, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 2202 may assume a variety of different configurations, such as for computer 2214, mobile 2216, and television 2218 uses. Each of these configurations includes devices that may have generally different constructs and capabilities, and thus the computing device 2202 may be configured according to one or more of the different device classes. For instance, the computing device 2202 may be implemented as the computer 2214 class of a device that includes a personal computer, desktop computer, a multi-screen computer, laptop computer, netbook, and so on.

The computing device 2202 may also be implemented as the mobile 2216 class of device that includes mobile devices, such as a mobile phone, wearable device, portable music player, portable gaming device, a tablet computer, a multi-screen computer, and so on. The computing device 2202 may also be implemented as the television 2218 class of device that includes devices having or connected to generally larger screens in casual viewing environments. These devices include televisions, set-top boxes, gaming consoles, and so on.

The techniques described herein may be supported by these various configurations of the computing device 2202 and are not limited to the specific examples of the techniques described herein. For example, functionalities discussed with reference to the client device 102, the communication service 124, and/or the quality service 126 may be implemented all or in part through use of a distributed system, such as over a "cloud" 2220 via a platform 2222 as described below.

The cloud 2220 includes and/or is representative of a platform 2222 for resources 2224. The platform 2222 abstracts underlying functionality of hardware (e.g., servers) and software resources of the cloud 2220. The resources 2224 may include applications and/or data that can be utilized while computer processing is executed on servers that are remote from the computing device 2202. Resources 2224 can also include services provided over the Internet and/or through a subscriber network, such as a cellular or Wi-Fi™ network.

The platform 2222 may abstract resources and functions to connect the computing device 2202 with other computing devices. The platform 2222 may also serve to abstract scaling of resources to provide a corresponding level of scale to encountered demand for the resources 2224 that are implemented via the platform 2222. Accordingly, in an interconnected device embodiment, implementation of functionality described herein may be distributed throughout the system 2200. For example, the functionality may be implemented in part on the computing device 2202 as well as via the platform 2222 that abstracts the functionality of the cloud 2220.

Discussed herein are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Implementations discussed herein include a system comprising at least one processor; and one or more computer-readable storage media including instructions stored thereon that, responsive to execution by the at least one processor, cause the system perform operations including: receiving, by at least one of an application or a service, an indication of signal quality of a wireless signal, the signal quality based on media data communicated between a client device and an endpoint device via the at least one of the application or the service; and performing, by the at least one of the application or the service, one or more actions based on the indication of signal quality, the one or more actions including at least one of: initiating a corrective procedure to attempt to increase the signal quality; or initiating an optimization procedure based on the indication of signal quality.

Implementations discussed herein include a system as described above, wherein the media data comprises at least one of voice data or video data communicated between the client device and the endpoint device.

Implementations discussed herein include a system as described above, wherein the media data comprises test data communicated between the client device and the endpoint device.

Implementations discussed herein include a system as described above, wherein said initiating the corrective procedure comprise performing, by the at least one of the application or the service, an error correction procedure on the media data.

Implementations discussed herein include a system as described above, wherein said initiating the corrective procedure comprise performing, by the at least one of the application or the service, forward error correction (FEC) on the media data.

Implementations discussed herein include a system as described above, wherein said initiating the corrective procedure comprise performing, by the at least one of the application or the service, a cyclical redundancy check (CRC) on the media data.

Implementations discussed herein include a system as described above, wherein said initiating the optimization procedure comprises at least one of increasing a codec rate used for communicating media data, or decreasing transmission power used to transmit media data.

Implementations discussed herein include a system as described above, wherein the one or more actions further include outputting a signal quality indicator based on the signal quality.

Implementations discussed herein include a system as described above, wherein the one or more actions further include outputting a signal quality indicator based on the signal quality as part of a graphical user interface, the graphical user interface comprising a primary graphical interface of the at least one of the application or the service.

Implementations discussed herein include a system as described above, wherein the one or more actions further include causing a selectable control to be displayed, the selectable control being selectable to cause said initiating the corrective procedure.

Implementations discussed herein include a system as described above, wherein the one or more actions further include causing a selectable control to be displayed, the selectable control being selectable to cause details concerning the signal quality to be presented.

Implementations discussed herein include a computer-implemented method comprising: ascertaining a signal quality of a wireless signal based at least in part on errors detected in data communicated via the wireless signal, the data including media data communicated between two or more devices; and communicating a notification of the signal quality to one or more of a communication application or a communication service that manages communication of the media data.

Implementations discussed herein include a computer-implemented method as described above, wherein the errors are detected via one or more of a cyclical redundancy check (CRC) performed on the data, or forward error correction (FEC) decoding performed on the data.

Implementations discussed herein include a computer-implemented method as described above, wherein the errors are detected based on a number of retransmissions of at least some of the data.

Implementations discussed herein include a computer-implemented method as described above, wherein said ascertaining and said communicating are performed by a quality service that is remote from a device on which the communication application resides.

Implementations discussed herein include a computer-implemented method as described above, wherein the indication of the signal quality includes one of an indication of a trend of decreasing signal quality, or a trend of increasing signal quality.

Implementations discussed herein include a computer-implemented method comprising: receiving an indication of signal quality of a wireless signal, the signal quality based at least in part on errors detected in media data communicated via at least one of an application or a service; and performing, by the at least one of the application or the service, one or more actions based on the indication of signal quality, the one or more actions including causing a graphical user interface to be displayed that includes a visual indication of the signal quality.

Implementations discussed herein include a computer-implemented method as described above, wherein the one or more actions further include causing a procedure to be performed to attempt to increase the signal quality.

Implementations discussed herein include a computer-implemented method as described above, wherein the one or more actions further include causing a procedure to be performed to attempt to increase the signal quality, the procedure including performing, by the one or more of the application or the service, at least one of forward error correction (FEC) or a cyclical redundancy check (CRC) on media data.

Implementations discussed herein include a computer-implemented method as described above, wherein the one or more actions further include causing one or more suggestions for increasing the signal quality to be displayed via the graphical user interface.

Conclusion

Techniques for indication of wireless signal quality are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
    at least one processor; and
    one or more computer-readable storage media including instructions stored thereon that, responsive to execution by the at least one processor, cause the system to perform operations including:
        receiving a signal strength value that indicates signal strength of a wireless signal used to communicate media data as part of communication between a client device and an endpoint device;
        ascertaining a quantity of errors detected in the wireless signal;
        determining an adjustment value based on the quantity of errors in the wireless signal;
        adjusting the signal strength value of the wireless signal using the adjustment value such that the adjusted signal strength value reflects a signal quality value for the wireless signal in accordance with the quantity of errors detected in the wireless signal; and
        outputting an indication of the signal quality value for display on a display device based at least in part on the adjusted signal strength value.

2. A system as described in claim 1, wherein the media data comprises at least one of voice data or video data communicated between the client device and the endpoint device.

3. A system as described in claim 1, wherein the operations further include:
    performing, by the at least one of an application or a service, one or more actions based on an indication of the signal quality, the one or more actions including at least one of:
    initiating a corrective procedure to attempt to increase the signal quality; or
    initiating an optimization procedure based on the indication of signal quality.

4. A system as described in claim 1, wherein the operations further include initiating a corrective procedure to attempt to increase the signal quality, said initiating the corrective procedure including performing, by at least one of an application or a service, an error correction procedure on the media data.

5. A system as described in claim 1, wherein the operations further include initiating a corrective procedure to attempt to increase the signal quality, said initiating the corrective procedure including performing, by at least one of an application or a service, forward error correction (FEC) on the media data.

6. A system as described in claim 1, wherein the operations further include initiating a corrective procedure to attempt to increase the signal quality, said initiating the corrective procedure including performing, by at least one of an application or a service, a cyclical redundancy check (CRC) on the media data.

7. A system as described in claim 1, wherein the operations further include initiating an optimization procedure based on an indication of the signal quality, said initiating the optimization procedure including at least one of increasing a codec rate used for communicating media data, or decreasing transmission power used to transmit media data.

8. A system as described in claim 1, wherein the outputting the indication of the signal quality for display on the display device includes outputting a signal strength indicator along with the indication of the signal quality.

9. A system as described in claim 1, wherein the outputting the indication of the signal quality for display on the display device includes outputting the indication of the signal quality as part of a graphical user interface of at least one of an application or a service.

10. A system as described in claim 1, wherein the operations further include:
 causing a selectable control to be displayed, the selectable control being selectable to cause initiation of a corrective procedure; and
 initiating the corrective procedure to attempt to increase the signal quality in response to selection of the selectable control.

11. A system as described in claim 1, wherein the operations further include causing a selectable control to be displayed, the selectable control being selectable to cause details concerning the signal quality to be presented.

12. A method comprising:
 determining a signal strength value for a wireless signal used to communicate data;
 detecting a number of errors in the data over a particular period of time;
 determining an adjustment value based on the number of errors;
 ascertaining, by a computing device, a signal quality value of the wireless signal by adjusting the signal strength value using the adjustment value, the data including media data communicated between two or more devices; and
 communicating a notification of the signal quality value to one or more of a communication application or a communication service that manages communication of the media data.

13. A method as recited in claim 12, wherein the number of errors are detected via one or more of a cyclical redundancy check (CRC) performed on the data, or forward error correction (FEC) decoding performed on the data.

14. A method as recited in claim 12, wherein the number of errors are detected based on a number of retransmissions of at least some of the data.

15. A method as recited in claim 12, wherein said ascertaining and said communicating are performed by a quality service that is remote from a device on which the communication application resides.

16. A method as recited in claim 12, wherein the the signal quality value includes one of an indication of a trend of decreasing signal quality, or a trend of increasing signal quality.

17. A method comprising:
 receiving, by a computing device, a signal quality value that indicates signal quality of a wireless signal, the signal quality value being determined by:
  determining a signal strength value for the wireless signal;
  detecting a number of errors data included in the wireless signal;
  determining an adjustment value based on the number of errors;
  adjusting the signal strength value based at least in part on the adjustment value; and
 performing, by the at least one of the application or the service, one or more actions based on the signal quality value, the one or more actions including causing a graphical user interface to be displayed that includes a visual indication of the signal quality.

18. A method as described in claim 17, wherein the one or more actions further include causing a procedure to be performed to attempt to increase the signal quality.

19. A method as described in claim 17, wherein the one or more actions further include causing a procedure to be performed to attempt to increase the signal quality, the procedure including performing, by the one or more of the application or the service, at least one of forward error correction (FEC) or a cyclical redundancy check (CRC) on media data.

20. A method as described in claim 17, wherein the one or more actions further include causing one or more suggestions for increasing the signal quality to be displayed via the graphical user interface.

* * * * *